United States Patent
Chu et al.

(10) Patent No.: US 10,659,593 B2
(45) Date of Patent: May 19, 2020

(54) METHOD AND ELECTRONIC DEVICE FOR SETTING ALARM

(71) Applicant: Samsung Electronics Co., Ltd., Gyeonggi-do (KR)

(72) Inventors: Se Youp Chu, Daegu (KR); Seung Kwon Park, Gyeongsangbuk-do (KR); Kang Won Lee, Daegu (KR); Jong Wu Baek, Gyeongsangbuk-do (KR); Eun Yeung Lee, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/903,454

(22) Filed: Feb. 23, 2018

(65) Prior Publication Data

US 2018/0255170 A1    Sep. 6, 2018

(30) Foreign Application Priority Data

Mar. 6, 2017  (KR) .......................... 10-2017-0028500

(51) Int. Cl.
*H04M 1/725* (2006.01)
*H04L 12/58* (2006.01)
(Continued)

(52) U.S. Cl.
CPC ...... *H04M 1/72566* (2013.01); *G04G 13/026* (2013.01); *G06Q 10/1097* (2013.01); *H04L 51/02* (2013.01)

(58) Field of Classification Search
CPC . H04M 1/72566; H04L 51/02; G06Q 10/026; G04G 13/1097
See application file for complete search history.

(56) References Cited

U.S. PATENT DOCUMENTS

| 6,678,613 B2 | 1/2004 | Andrews et al. |
| 7,541,940 B2 | 6/2009 | Upton |

(Continued)

FOREIGN PATENT DOCUMENTS

| KR | 10-0650908 B1 | 11/2006 |
| KR | 10-2011-0079965 A | 7/2011 |

(Continued)

OTHER PUBLICATIONS

European Search Report dated May 8, 2018.
International Search Report dated May 29, 2018.

*Primary Examiner* — Edward F Urban
*Assistant Examiner* — Angelica M Perez
(74) *Attorney, Agent, or Firm* — Cha & Reiter, LLC

(57) ABSTRACT

An electronic device includes a housing, one or more input/output (I/O) interfaces included in or on the housing, a processor, and a memory, wherein the memory stores a plurality of templates associated with a plurality of tasks, wherein each of the templates includes a plurality of parameters for at least partially completing a respective one of the tasks, and wherein the memory further stores instructions that, when executed, cause the processor to: receive a user input to set up an alarm associated with a task to be performed at a selected time, wherein the input includes a first time parameter associated with the selected time; select one of the plurality of templates; determine a second time parameter of the plurality of parameters of the selected template; determine a time for the alarm; and provide the alarm at the determined time.

17 Claims, 29 Drawing Sheets

(51) Int. Cl.
*G04G 13/02* (2006.01)
*G06Q 10/10* (2012.01)

(56) References Cited

U.S. PATENT DOCUMENTS

| | | |
|---|---|---|
| 8,014,794 B2 | 9/2011 | Huh et al. |
| 8,234,194 B2 | 7/2012 | Mele et al. |
| 9,053,509 B2 | 6/2015 | Azose |
| 9,177,257 B2 | 11/2015 | Kozloski et al. |
| 9,349,100 B2 | 5/2016 | Kozloski et al. |
| 9,460,608 B2 | 10/2016 | Dave et al. |
| 9,656,123 B2 | 5/2017 | Azose |
| 9,808,404 B2 | 11/2017 | Nolan et al. |
| 9,881,281 B2 | 1/2018 | Burka |
| 10,026,063 B2 | 7/2018 | Dave et al. |
| 2003/0060979 A1 | 3/2003 | Andrews et al. |
| 2007/0188319 A1 | 8/2007 | Upton |
| 2008/0139245 A1 | 6/2008 | Huh et al. |
| 2011/0202474 A1 | 8/2011 | Mele et al. |
| 2014/0067729 A1 | 3/2014 | Kozloski et al. |
| 2014/0067730 A1 | 3/2014 | Kozloski et al. |
| 2014/0070945 A1* | 3/2014 | Dave ............... G08B 21/24 340/540 |
| 2014/0278676 A1* | 9/2014 | Burka ............... G06Q 10/1093 705/7.19 |
| 2015/0066683 A1 | 3/2015 | Azose |
| 2015/0209616 A1 | 7/2015 | Azose |
| 2016/0063451 A1 | 3/2016 | Umapathy et al. |
| 2016/0093304 A1* | 3/2016 | Kim ............... G10L 17/26 704/235 |
| 2016/0148494 A1* | 5/2016 | Kim ............... G08B 25/10 340/539.11 |
| 2016/0354285 A1 | 12/2016 | Nolan et al. |
| 2017/0178086 A1 | 6/2017 | Dave et al. |
| 2017/0203156 A1 | 7/2017 | Azose |

FOREIGN PATENT DOCUMENTS

| | | |
|---|---|---|
| KR | 10-1523996 B1 | 5/2015 |
| KR | 10-2016-0055738 A | 5/2016 |
| WO | 01/37541 A2 | 5/2001 |
| WO | 2016/033353 A1 | 3/2016 |
| WO | WO-2016033353 A1 * | 3/2016 ........... G06Q 10/107 |

* cited by examiner

```
┌─────────────────────────────────────────────────────┐
│ 06:30 AM  ⏰  PURPOSE:GO TO WORK       DEPARTURE:SUWON │ ←── 901
│              TRANSPORTATION:CAR        ARRIVAL:SEOUL   │
└─────────────────────────────────────────────────────┘
                          ⇩
┌─────────────────────────────────────────────────────┐
│ 06:30 AM  ⏰  PURPOSE:GO TO WORK       DEPARTURE:SUWON │ ←── 902
│              TRANSPORTATION:CAR ->TRAIN  ARRIVAL:SEOUL │
└─────────────────────────────────────────────────────┘
                          ⇩
┌─────────────────────────────────────────────────────┐
│ 06:30 AM  ⏰  PURPOSE:GO TO WORK       DEPARTURE:SUWON │ ←── 903
│              TRANSPORTATION:TRAIN      ARRIVAL: SEOUL  │
│    ☑  SAEMAUL TRAIN SUWON -> SEOUL 07:00 - 07:30       │
│                        4,600 WON                        │
│    ☐  MUGUNGHWA TRAIN SUWON -> SEOUL 07:15- 07:50      │
│                        2,600 WON                        │
└─────────────────────────────────────────────────────┘
                          ⇩
┌─────────────────────────────────────────────────────┐
│ 05:30 AM  ⏰  PURPOSE:GO TO WORK       DEPARTURE:SUWON │ ←── 904
│              TRANSPORTATION:TRAIN      ARRIVAL:SEOUL   │
│    ☑  SAEMAUL TRAIN SUWON -> SEOUL 07:00 - 07:30       │
│          ☑  SET UP ALARM BEFORE ARRIVAL                │
└─────────────────────────────────────────────────────┘
                          ⇩
┌─────────────────────────────────────────────────────┐
│           PURPOSE:GO TO WORK        DEPARTURE:SUWON    │
│ 05:30 AM ⏰ TRANSPORTATION:TRAIN    ARRIVAL:SEOUL      │ ←── 905
│           TRANSPORTATION INFORMATION:                  │
│           TRAIN-SAEMAUL TRAIN (07:00)                  │
│      ☒ 05:26 AM  ⏰ PURPOSE:GO TO WORK                 │
│      ☒ 05:28 AM     ALARM:05:30                        │
│      ☒ 07:26 AM  ⏰ TRANSPORTATION:TRAIN               │
│      ☒ 07:28 AM     ARRIVAL TIME:07:30                 │
└─────────────────────────────────────────────────────┘
```

Chat BOT  🔋12:45

ALARM! I'M GOING TO TRAVEL TO JEJU ISLAND BY AIRPLANE ON AUGUST 1   SEND

| DOMESTIC TRAVEL | |
|---|---|
| ☐ | SWIMSUIT |
| ☐ | TOILETRIES (SHAMPOO, SOAP, TOOTHBRUSH, TOOTHPASTE) |
| ☐ | TOWEL SHEETS |
| ☐ | DRIVER'S LICENSE |

1402

| DOMESTIC TRAVEL | |
|---|---|
| ☐ | SWIMSUIT |
| ☐ | TOILETRIES (SHAMPOO, SOAP, TOOTHBRUSH, TOOTHPASTE) |
| ☐ | TOWEL SHEETS |
| ☐ | PASSPORT |
| ☐ | THICK CLOTH |
| ☐ | UNDERWEAR ☐PIECE(S) |
| ☐ | SOCKS ☐PAIR(S) |

1403

| COOKING - INGREDIENTS - SPAGHETTI - ALLIO OLIGO | |
|---|---|
| ☐ | SPAGHETTI FOR ONE SERVING |
| ☐ | 10 WHOLE BULBS OF GARLIC |
| ☐ | THREE PEPPERONCHINOS |
| ☐ | A LITTLE BIT OF CHEESE |
| ☐ | A SMALL AMOUNT OF PARSLEY POWDERS |

1404

| COOKING - INGREDIENTS - SPAGHETTI - ALLIO OLIGO | |
|---|---|
| ☐ | 1. SLICING GARLIC |
| ☐ | 2. CRUSHING PEPPERONCHINO |
| ☐ | 3. BOILING WATER HAVING A LITTLE BIT OF SAULT |
| ☐ | 4. BOILING SPAGHETTI NOODLES - ADD 9 MINUTE ALARM |
| ☐ | 5. FRYING SLICED GARLIC WITH FOUR TABLESPOON OLIVE OIL |
| ☐ | 6. FRYING WITH PEPPERONCHINO |
| ☐ | 7. FRYING WITH BOILED NOODLE |
| ☐ | 8. ADDING BOILED NOODLE WATER AND SPREADING PARSLEY POWDERS |

1405

| DIET | |
|---|---|
| ☐ | BREAKFAST WITH ONE CUP OF MILK-ALARM AT EIGHT O'CLOCK A.M. |
| ☐ | LUNCH WITH MEAL SERVED AT RESTAURANT |
| ☐ | 20 MINUTE WALK AFTER LUNCH- NOTIFICATION AT 12:30 P.M. |
| ☐ | DINNER WITH SALAD - NOTIFICATION AT 18:00 P.M. |
| ☐ | ONE-HOUR WORKOUT AFTER DINNER - NOTIFICATION 18: 30 P.M. |
| ☐ | SETTING UP WITH DAILY REPETITION |

1406

| DIET - (ANOTHER USERS) | |
|---|---|
| ☐ | WAKE UP AT 7:00 A.M. - NOTIFICATION AT 7:00 A.M. |
| ☐ | WALK AT 7:30 A.M. - NOTIFICATION AT 7:10 A.M. |
| ☐ | BREAKFAST WITH 1 GLASS OF JUICE + NUTS - NOTIFICATION AT 8:00 A.M. |
| ☐ | HAVING LUNCH WITH A LOT OF DESIRED FOODS |
| ☐ | 20 MINUTE WALK AFTER LUNCH-NOTIFICATION AT 12:30 P.M. |
| ☐ | DINNER WITH SALAD AND NUTS - NOTIFICATION AT 18:00 P.M. |
| ☐ | 30-MINUTE WORKOUT AFTER DINNER - NOTIFICATION 18: 30 P.M. |
| ☐ | NOTIFICATION OF "BEAR HUNGER" - NOTIFICATION FROM 21:00 TO 23:00 AT ONE HOUR INTERVAL. |
| ☐ | SETTING UP WITH DAILY REPETITION |

FIG.14

METHOD AND ELECTRONIC DEVICE FOR SETTING ALARM

CROSS-REFERENCE TO RELATED APPLICATION(S)

This application is based on and claims priority under 35 U.S.C. § 119 of a Korean patent application No. 10-2017-0028500, filed on Mar. 6, 2017, in the Korean Intellectual Property Office, the disclosure of which is incorporated by reference herein in its entirety.

TECHNICAL FIELD

The present disclosure relates to a method for setting up an alarm and an electronic device for performing the same.

BACKGROUND

As information technologies (IT) or mobile communication technologies have been developed, various types of electronic products have been developed and distributed. In particular, recently, an electronic device, which has various functions, such as a smartphone, a tablet PC, or a wearable device has been extensively spread. Such an electronic device may provide, for a user, a very broad range of services or functions, such as a call, a video call, multimedia viewing, message sending, web browsing, health care, or the like, by executing applications developed by various developers.

The above information is presented as background information only to assist with an understanding of the present disclosure. No determination has been made, and no assertion is made, as to whether any of the above might be applicable as prior art with regard to the present disclosure.

SUMMARY

Among services or functions provided by the electronic device, there is an alarm function. The electronic device may provide, for a user, a notification by various means at a time specified by the user through the alarm function. The alarm function may be installed in the electronic device through an application.

Aspects of the present disclosure are to address at least the above-mentioned problems and/or disadvantages and to provide at least the advantages described below. Accordingly, an aspect of the present disclosure is to provide a method for providing an appropriate template by detecting the purpose that a user sets up an alarm, providing information necessary for accomplishing the purpose of the user, and adjusting a time specified by the user, when providing the arm at the time specified by the user, and an apparatus for performing the same.

In accordance with an aspect of the present disclosure, an electronic device comprising a housing, one or more input/output (I/O) interfaces included in or on the housing, a processor electrically connected to the one or more I/O interfaces, and a memory electrically connected to the processor, wherein the memory stores a plurality of templates associated with a plurality of tasks, wherein each of the templates includes a plurality of parameters for at least partially completing a respective one of the tasks, and wherein the memory further stores instructions that, when executed, cause the processor to: receive, via the one or more input/output interfaces, a user input to set up an alarm associated with a task to be performed at a selected time, wherein the input includes a first time parameter associated with the selected time; select one of the plurality of templates, based at least partly on the user input; determine a second time parameter of the plurality of parameters of the selected template, based at least partly on data stored in the memory or received from outside the electronic device; determine a time for the alarm, based at least partly on the first time parameter and the second time parameter; and provide the alarm at the determined time via the one or more input/output interfaces.

In accordance with another aspect of the present disclosure, an electronic device may include an input device; a display; a processor; and a memory electrically connected to the input device, the display, and the processor, wherein the memory stores instructions that, when executed, cause the processor to: receive a first user input including a task and a time parameter via the input device; retrieve a template associated with the task, wherein the template comprises a plurality of fields; display the template, on the display with at least one of the plurality of fields populated with at least one item; and provide a specified alarm for a user at a time based on the time parameter, when the template is completed by a second user input received via the input device.

In accordance with another aspect of the present disclosure, a method for setting up an alarm of an electronic device, the method comprising: receiving a user input including a task and a time parameter; retrieving a template associated with the task, wherein the template comprises a plurality of fields; displaying, on a display, the template with at least one of the plurality of fields populated with at least one item; and providing a specified alarm for a user at a time based on the time parameter, when each of the plurality of fields of the template are populated by an additional user input.

According to embodiments disclosed in the present disclosure, the electronic device may retrieve the most appropriate template to an alarm purpose (task) and may provide the optimal alarm for the user, based on the retrieved template. Besides, various effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a view illustrating the method for setting up the alarm, according to an embodiment;

FIG. 13A, FIG. 13B, FIG. 13C, FIG. 13D, FIG. 13E and FIG. 13F are views illustrating that a method for setting up an alarm is implemented to be performed together with an interactive application, according to another embodiment; and FIG. 14 illustrates examples of alarm templates, according to various embodiments.

DETAILED DESCRIPTION

Figure 1:
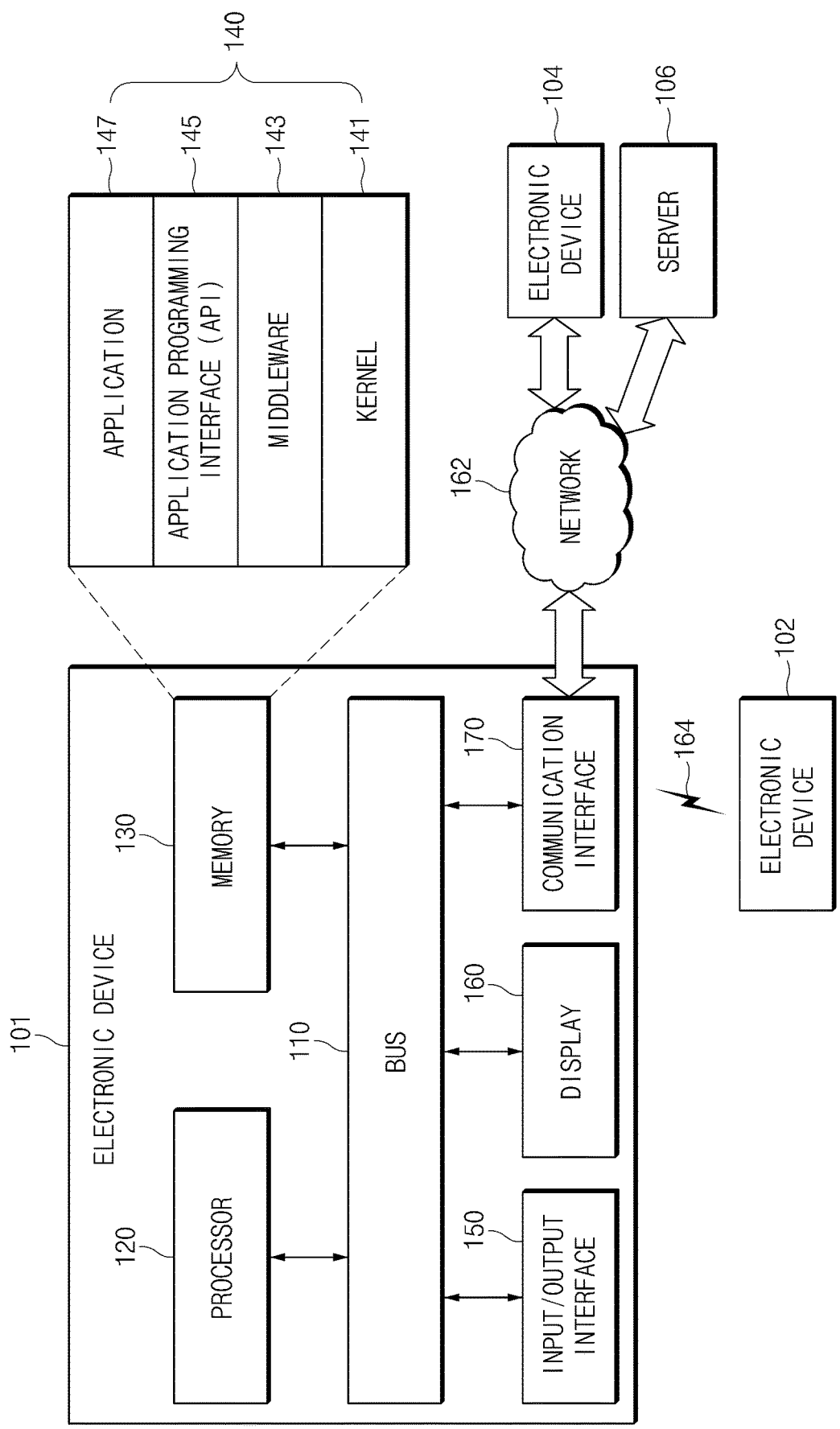
FIG. 1 illustrates an electronic device in a network environment, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store commands or data associated with at least one other element(s) of the electronic device 101. According to an embodiment, the memory 130 may store software and/or a program 140.

The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other element(s) of the electronic device 101. Furthermore, the input/output interface 150 may output a command or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second example electronic device 104 or the server 106).

The wireless communication may include cellular communication which uses at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, Bluetooth low energy (BLE), Zigbee, near field communication (NFC), magnetic secure transmission (MST) (magnetic stripe transmission or magnetic secure transmission), radio frequency (RF), body area network (BAN), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MSR (magnetic stripe reader or magnetic secure transmission reader). The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

In certain embodiments, the memory 130 stores a plurality of templates. The templates are data structures that include fields such as tasks, times, and locations. The templates can also include dynamic fields, such as weather, traffic conditions, and public transportation schedule information. The I/O interface 150 can receive a user input to set up an alarm associated with a task to be performed at a selected time, and a first time parameter. The processor 120 can determine a second time parameter using either data stored in the memory 130 or data received from outside the electronic device 101, such as via the communication interface 170, and determine a time for the alarm, based at least partly on the first time parameter and the second time parameter, and provide the alarm via the I/O interface 150.

Figure 2:
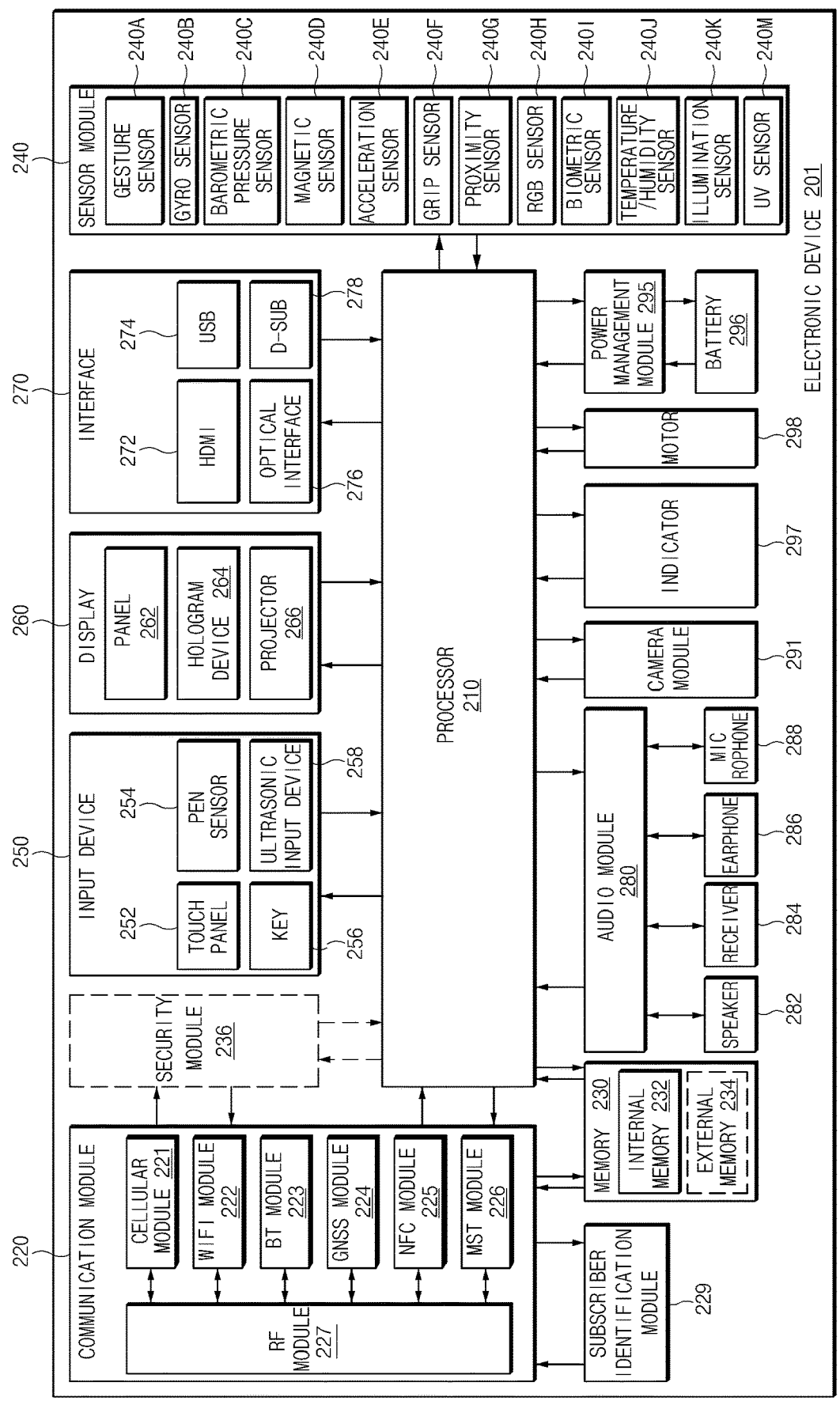
FIG. 2 illustrates a block diagram of the electronic device, according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load a command or data, which is received from at least one of other elements (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, and the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MEL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

In certain embodiments, the microphone 288, touch panel 252, or key 256 can receive user input to set up an alarm associated with a task to be performed at a selected time. The display 260 can provide a prompt to the user to provide another parameter or user input and provide the alarm at a determined time. In some embodiments, the speaker 282 may prompt the user and provide the alarm.

Figure 3:
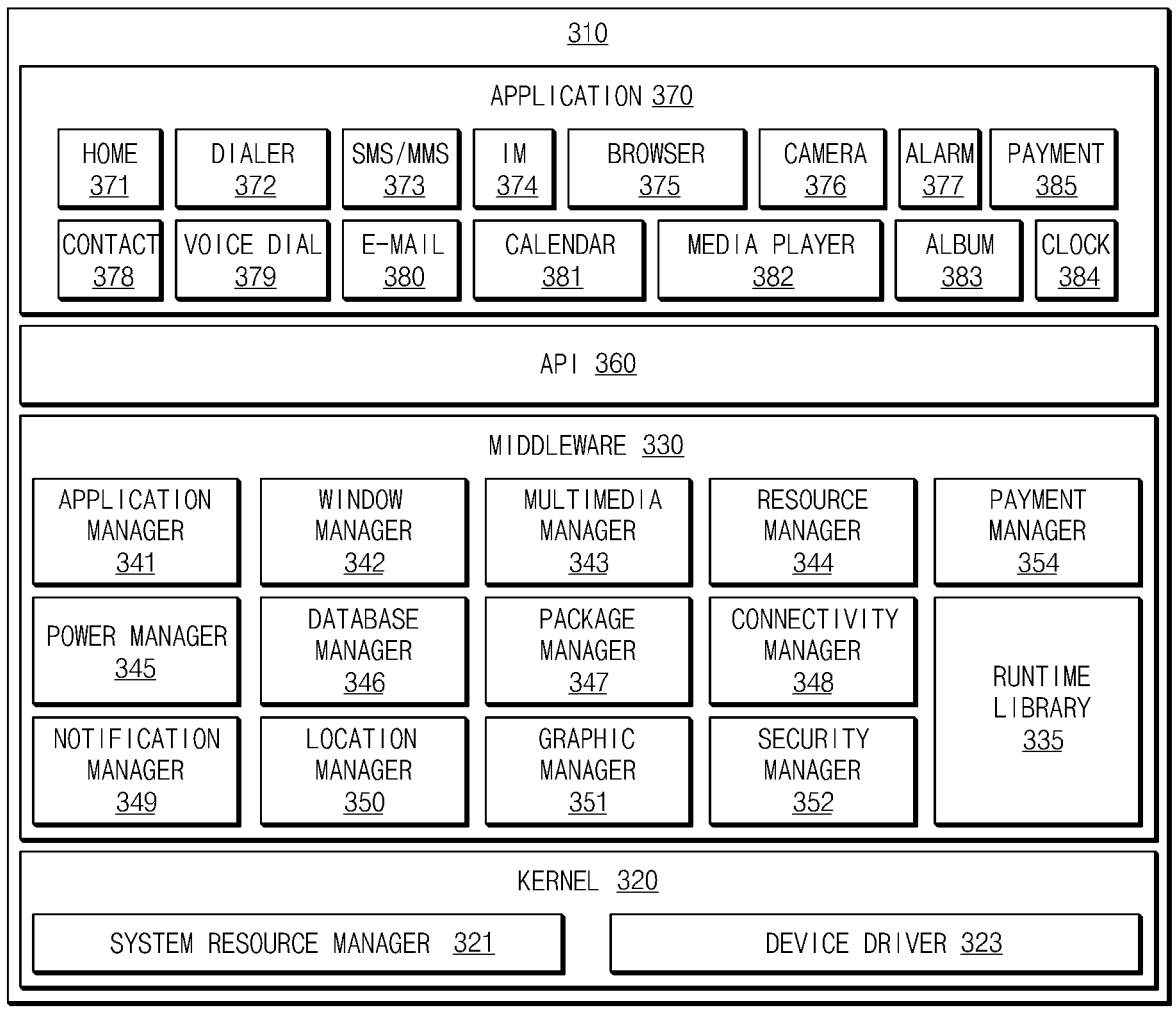
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, Tizen, or Bada.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is Android or iOS, it may provide one API set per platform. In the case where an OS is Tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, and a payment 385 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the first electronic device 102 or the second electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include a specified application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
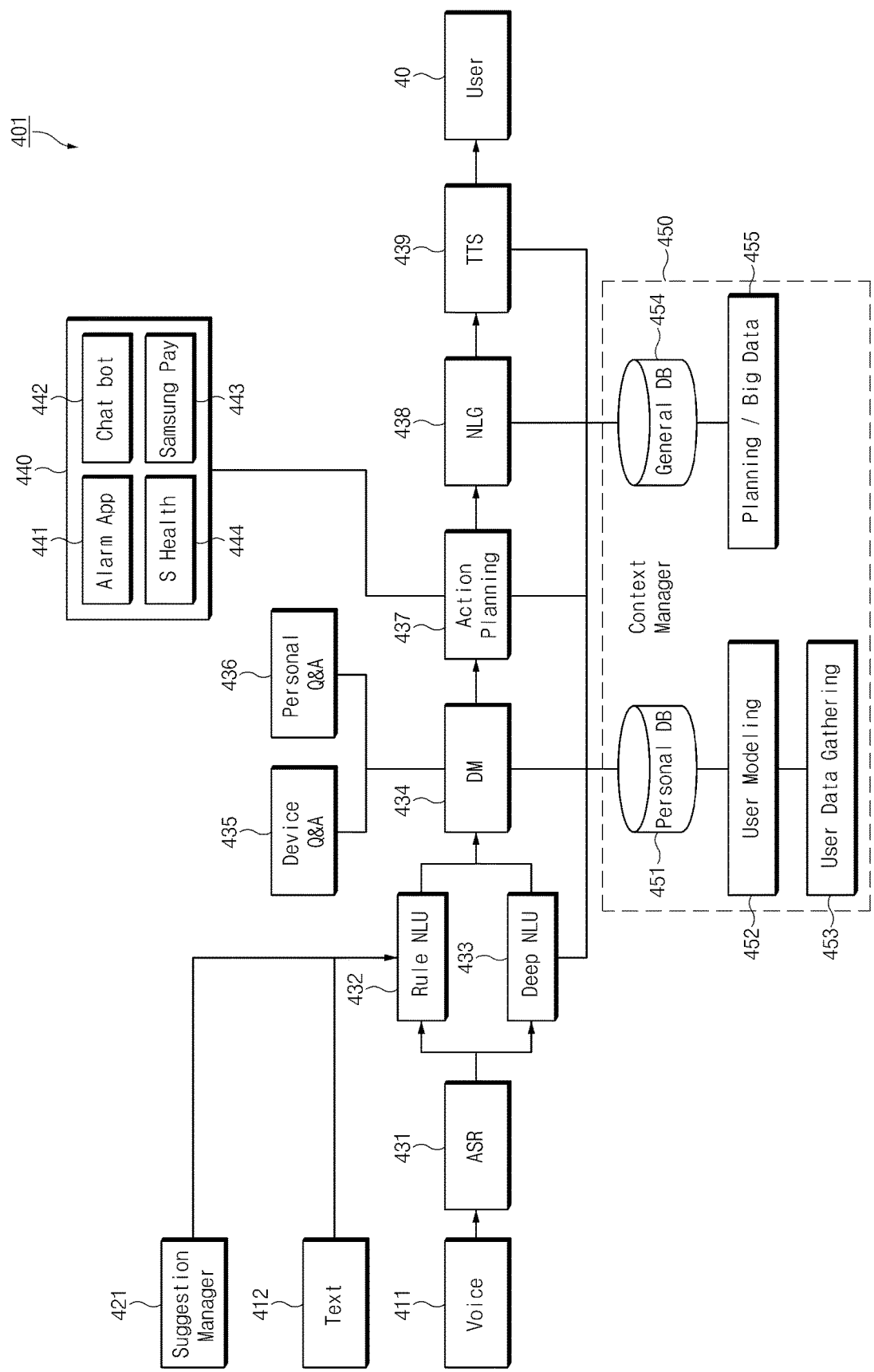
FIG. 4 is a view illustrating an environment that a method for setting up an alarm is performed, according to an embodiment.

FIG. 4 is a view illustrating an environment that a method for setting up an alarm is performed, according to an embodiment.

Referring to FIG. 4, according to an embodiment, under an environment 401 that the method for setting up the alarm is performed, an electronic device and/or a server may receive a user input, which can be a natural language (NL input, such as a voice input or a free-form textual input, from a user 40, may extract the intent of the user 40 or a context from the user input, and may perform an action the most appropriate to the context, thereby providing a certain service for the user 40.

According to an embodiment, the user 40 may input a voice input 411 or a text input 412 into the electronic device. When the user 40 provides the voice input 411, the voice input 411 may be converted into a text by an automatic speech recognition (ARS) module 431. According to various embodiments, a suggestion manager 421 may prompt the user 40 to provide a specified input and may provide a domain including the specified input to a natural language understanding (NLU) module. The NLU module may include a rule NLU module 432 and a deep NLU module 433.

According to an embodiment, the rule NLU module 432 and the deep NLU module 433 may detect the intent of a user based on the voice input 411 converted into the text or the text input 412. For example, the rule NLU module 432 and the deep NLU module 433 may detect the intent of the user by performing a syntactic analysis or a sematic analysis.

For example, the syntactic analysis may include dividing the user input in a grammatical unit (e.g., a word, phrase, or morpheme) and detecting a grammatical element in the grammatical unit. The syntactic analysis may be performed through sematic matching, rule matching, formula matching, or the like. Accordingly, the NLU modules 432 and 433 may obtain a domain including the user input (e.g., the voice input 411 or the text input 412), an intent included in the user input, and a parameter necessary for expressing the intent. For example, the user input can be examined for a grammatical verb, which is indicative of the task, words indicative of scheduling, such as "meeting", or "appointment", and words indicative of locations, such as geographical locations. Additionally, the user input can also be examined for words that indicate modes of transportation, such as "drive" (car), "ride" (public transportation), and "flight" (airplane).

For example, the user input may be a user input of "Set up an alarm so I can get up at 7:30 tomorrow." In this case, the NLU modules 432 and 433 may detect that the user input is in a domain of "Alarm" by analyzing user input. In addition, the NLU module detects the intent of the user for setting up the alarm through the user input, and various parameters for setting up the alarm. For example, the parameters for setting up the alarm may include an alarm purpose parameter (e.g., wake-up), an alarm time parameter (7:30 a.m.), or the like. According to an embodiment, a dialog manager (DM) 434 may determine a next action by using information retrieved from a device Q&A module 435, a personal Q&A module 436, and a context manager 450 and the intent of the user detected by the rule NLU module 432 and the deep NLU module 433. The DM 434 may determine whether the intent of the user is apparent. The DM 434 may determine whether the detected intent of the user is sufficient to perform the next action or additional information is necessary. To this end, the DM 434 may interact with the device Q&A module 435, the personal Q&A module 436, and the context manager 450. For example, the operation of the DM 434 may be performed when a specified function (e.g., an alarm) is implemented by using a chat bot interface.

According to an embodiment, an action planning module 437 may call various applications 440 to perform an action determined by the DM 434. The applications 440 may include an alarm application 441, a chat bot application 442, a payment application 443 (e.g., SamsungPay™), and a health management application 444 (e.g., S-Health™). For example, when the application 440 provides content for the user, the action planning module 437 may provide the content to a NLG module 438. For example, when the user input intends the setting-up of the alarm, the change of the alarm, or the release of the setting-up of the alarm, the action planning module 437 may call the alarm application 441 or the chat bot application 442 associated with the alarm. The called application may perform the action (e.g., the setting-up of the alarm, the change of the alarm, or the release of the setting-up of the alarm) determined by the DM 434.

According to an embodiment, the NLG module 438 may make the content in a NL and may generate the NL in a text format. The text format may be similar to NL utterance. Information created in the text format may be output onto the display of the electronic device or may be output in a voice through a text to speech (TTS) module 439 output through a speaker. For example, when an alarm based on the user input is set up, the NLG module 438 may make the set-up result of the alarm in the NL to output the set-up result onto the display of the electronic device or to output the set-up result in a voice through the TTS module 439 via a speaker.

According to an embodiment, the TTS module 439 may convert the information created in the text format into a voice. The information converted into the voice by the TTS module 439 may be provided for the user 40 through an audio output module (e.g., a speaker).

According to an embodiment, the context manager 450 may include a personal DB 451, a user modeling module 452, a user data gathering module 453, a general DB 454, and a planning/big data module 455. The context manager 450 may determine a context included in the NL by using the various modules 451 to 455. The context manager 450 may return the determination result of the context in response to the request of other modules (e.g., 433, 434, 437, 438, and 439).

Figure 5:
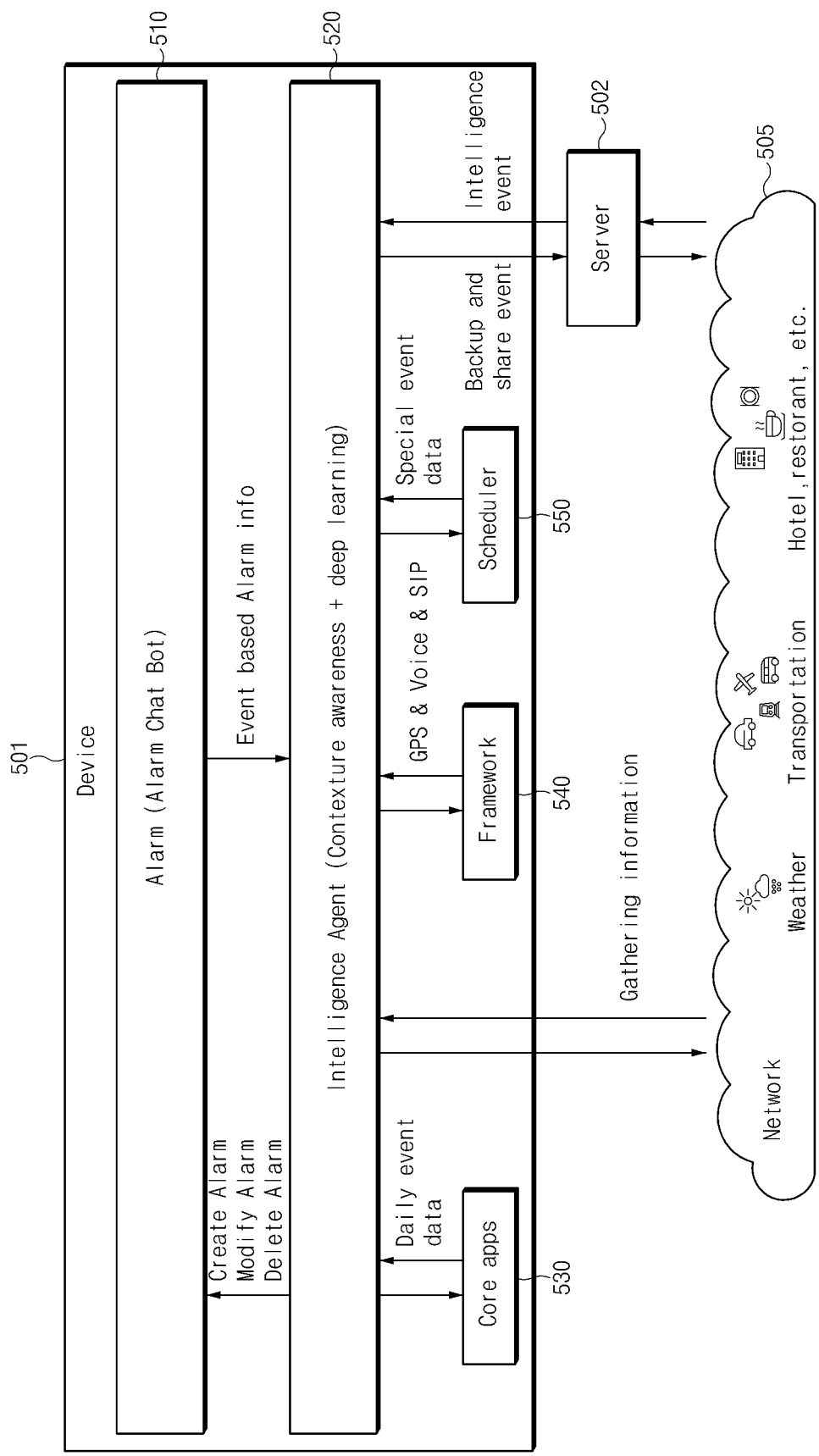
FIG. 5 is a block diagram illustrating a method for setting up an alarm, according to an embodiment.

FIG. 5 is a block diagram illustrating the method for setting up the alarm, according to an embodiment;

Referring to FIG. 5, according to an embodiment, software implemented by an electronic device 501 may include an alarm application 510, an intelligence agent 520, a core application 530, a framework 540, and a scheduler 550. The electronic device 501 may communicate with a server 502 and may access a network 505 (e.g., the Internet).

According to an embodiment, the intelligence agent 520 may receive an alarm information-based event from the alarm application 510. According to an embodiment, the alarm application 510 may be a chatting/messenger application in which an alarm chat bot is embedded.

The intelligence agent 520 may retrieve various pieces of data or information inside the electronic device 501 or from the server 502 and/or the network 505 and may create, modify, or delete the alarm, based on the retrieved information. The intelligence agent 520 may detect the intent of the user and/or the context by analyzing the retrieved data or information, and may create, modify, or delete the optimized alarm through deep learning.

According to an embodiment, the intelligence agent 520 may retrieve various pieces of data from the core application 530, the framework 540, and the scheduler 550. For example, the intelligence agent 520 may retrieve daily event data, which occurs every day, from the core application 530, may retrieve location data (GPS data), voice data, and session initiation protocol (SIP) data from the framework 540, and may retrieve special event data from the scheduler 550. In addition, for example, the intelligence agent 520 may retrieve various pieces of external information (e.g., information on weather, transportation, hotels, or restaurants) from the network 505.

According to various embodiments, at least some of functions of the intelligence agent 520 may be performed by the server 502. In addition, the server 502 may provide a specified event (so called, an intelligence event) to the electronic device 501 in response to receiving a backup or share event from the electronic device 501.

Figure 6:
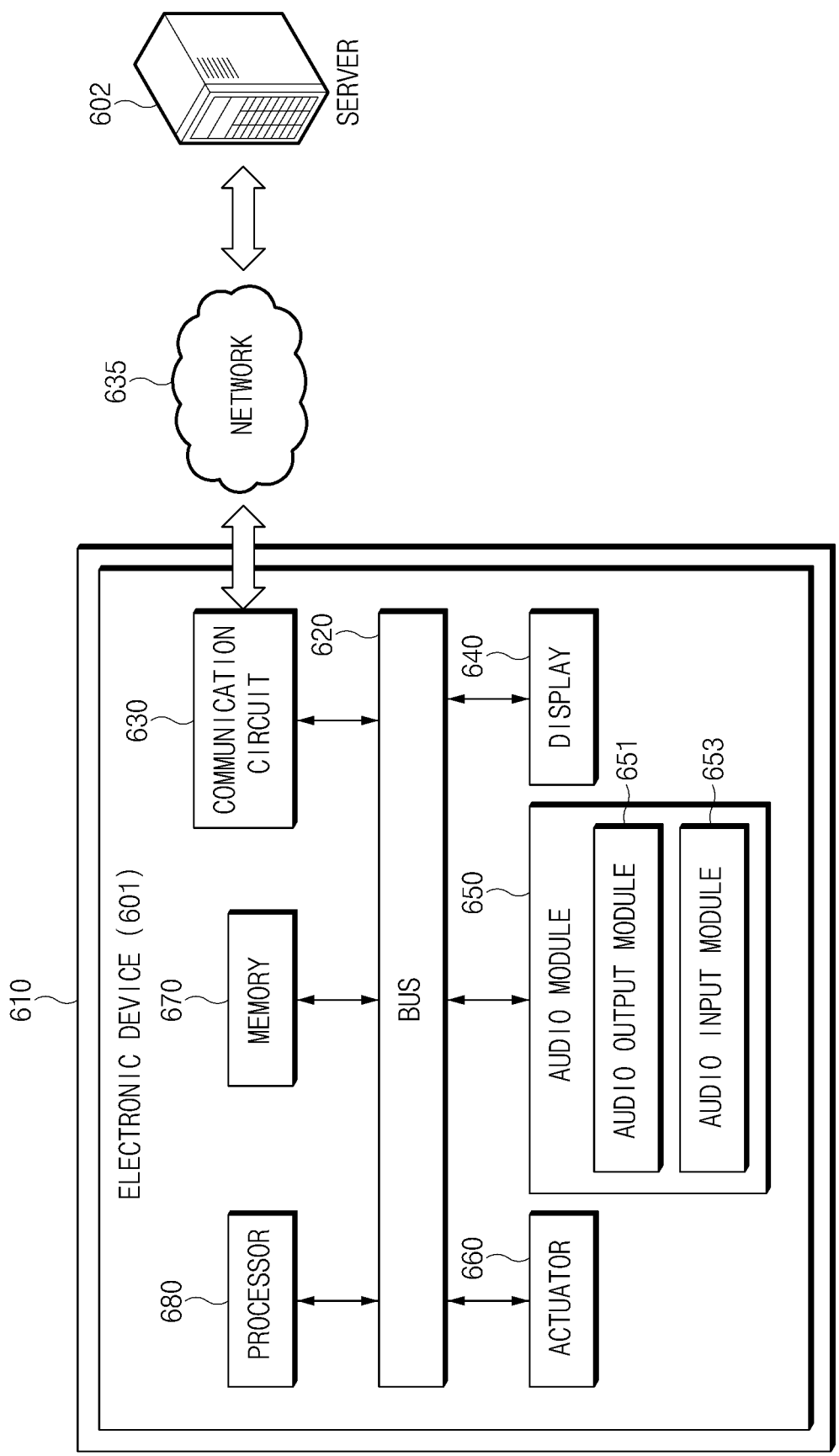
FIG. 6 illustrates an electronic device and a server, according to an embodiment.

FIG. 6 illustrates an electronic device and a server, according to an embodiment.

Referring to FIG. 6, according to an embodiment, an electronic device 601 may include a housing 610, a bus 620, a communication circuit 630, a display 640, an audio module 650, an actuator 660, a memory 670, and a processor 680. According to various embodiments, the electronic device 601 may additionally include an element which is not illustrated in FIG. 6, or may not include some of elements illustrated in FIG. 6.

The housing 610 may constitute, for example, an outer appearance of the electronic device 601, and may receive the elements included in the electronic device 601. The housing 610 may be, for example, formed of plastic, glass, and/or metal.

The bus 620 may include, for example, a circuit to connect the elements 630 to 680 to each other and to transmit communication information (e.g., a control message and/or data) between the elements.

For example, the communication circuit 630 may communicate with another device (e.g., a server 602) through a wired/wireless network 635.

The display 640 may display, for example, content (e.g., a text, an image, a video, an icon, an object, a symbol, or the like). The display 640 may include a touch screen panel and may receive, for example, a touch, gesture, proximity, or hovering input using an electronic pen or a part of a body of a user.

The audio module 650 may include, for example, an audio output module 651 and an audio input module 653. The audio output module 651 may convert an audio signal into a sound. For example, the audio output module 651 may include a speaker, an earphone, or a headphone. The audio input module 653 may obtain sound (e.g., the utterance or a speech of a user) generated from the outside and may convert the sound into an electrical signal (an audio signal). For example, the audio input module 653 may include one or more microphones.

The memory 670 may store various programs or various pieces of data associated with operations of the elements included in the electronic device 601.

For example, the memory 670 may store a plurality of templates associated with a plurality of tasks. Each of the templates includes an item (or a parameter) for at least partially completing a respective one of the tasks. Each template may include at least one item used to process the respective task. For another example, the memory 670 may store data on a template creation history of a user.

A template can be a data structure that includes a plurality of variables representing different fields. The variables can be set to equal various values based on user input, including NL input, such as voice input.

The memory 670 may store instructions that, when executed, cause the processor 680 to perform various operations disclosed in the present disclosure. The instructions may be implemented by an application program or firmware, may be embedded in a certain chip, or may be stored on the memory 670 or a computer-readable recording medium.

The "input device" referred to in this specification may be designated as a device, an element or the combination thereof which is able to receive various inputs from the user. The "input device" may be disposed inside the housing 610 or on the surface of the housing 610. For example, the "input device" may include, but is not limited to, the audio input module 653 or a touch screen panel included in the display 640.

According to various embodiments, the input device and the output device (e.g., the display 640, the audio output module 651, the actuator 660, or the like) may be referred to as "(one or more) input/output (I/O) interface(s)" in terms of providing an interface allowing a user to interact with the electronic device 601. In this regard, the I/O interface may include a display displaying a UI screen. A UI screen may represent a screen implemented to allow the user to provide an input through the touch screen panel and may have characteristics of the input device and the output device.

The processor 680 may be, for example, electrically connected to elements included in the electronic device 601 through the bus 620. The processor 680 may execute operation or data processing associated with control and/or communication of the elements included in the electronic device 601.

According to an embodiment, the processor 680 may receive, via the UI, an NL request to set up an alarm associated with a task to be performed at a selected time. The NL request may include a first time parameter associated with the selected time. The NL request received via the UI may have a text or voice format.

According to an embodiment, the processor 680 may select one of the plurality of templates, based at least partly on the NL request.

According to an embodiment, the processor 680 may determine a second time parameter of the plurality of parameters (items) of the selected template, based at least partly on data stored on the memory 670 and/or received from the external electronic device (e.g., the server 602) through the network 635. According to an embodiment, when the second time parameter cannot be determined, based at least partly on the data, the processor 680 may provide an inquiry (or a guide) as to the second parameter via the user interface, and may receive an NL input via the user interface in response to the inquiry. The processor 680 may determine the second time parameter, based at least partly on the NL input.

According to an embodiment, the processor 680 may determine a time for the alarm, based at least partly on the first time parameter and the second time parameter, and may provide the alarm at the determined time via the user interface. For example, the processor 680 may determine at least one of a pattern, frequency, or sound level of the sound or vibration alarm generated from the audio output module 651. In addition, the processor 680 may provide the alarm using the at least one of the pattern, the frequency, or the sound level via the UI.

According to another embodiment, the processor 680 may receive, through the input device (e.g., the touch screen panel of the display 640 or the audio input module 653), the input of the user who intends to set up the alarm. For example, the user input may include a task parameter representing a work (that is, task) to be performed by a user at a specified time and a time parameter representing the specified time. The user input may include the NL input and may have a text or voice format depending on an input device receiving the user input.

According to an embodiment, the processor 680 may retrieve a template associated with a task included in the user input. For example, the processor 680 may extract the task by analyzing the user input and may retrieve the template associated with the task from the memory 670. The processor 680 may add or modify an item included in the retrieved template by using information retrieved through the network 635 (e.g., the Internet, a public API, or the like). For another example, the processor 680 may transmit the user input to the server 602 through the communication circuit 630 and may retrieve the template associated with the task from the server 620 in response to the transmission of the user input. The server 602 may add or modify an item included in the retrieved template by using information retrieved through the network 635 (e.g., the Internet, a public API, or the like).

According to an embodiment, the processor 680 may display at least one of a plurality of items included in the retrieved template on the display 640. The user may complete the template by filling out the item displayed on the display 640 through the input device provided in the electronic device 601. According to various embodiments, the processor 680 may automatically fill out some of a plurality of items included in the template, based on data on a template creation history of the user, which is stored on the memory 670.

According to an embodiment, the processor 680 may provide, for a user, a specified alarm at a time set based on a time parameter (included in the user input), when the template is completed. In the present disclosure, the completing of the template refers to filling out at least one item necessary for performing a specified function, and does not refer to essentially filling out all items included in the template. According to an embodiment, the time set based on the time parameter may be the same as a time represented by the time parameter or may be determined depending on information included in the completed template.

The above providing a specified alarm may include, for example, displaying a UI screen, in which the completed template is reflected, on the display 640, generating a specified sound by the audio output module 651, and/or generating a vibration by the actuator 660. According to various embodiments, at least one of a time at which the sound is generated from the audio output module 651, the volume of the sound, a pattern in which the sound is generated, or the number of times that the sound is generated may be determined based on the completed template. Similarly, at least one of a time at which the vibration is generated from the actuator 660, the intensity of the vibration, the pattern in which the vibration is generated, or the number of times in which the vibration is generated may be determined based on the completed template.

The described operation of the processor 680 is provided by way of example, but is not limited to the above-description. For example, even operations of the processor described in other portions of the present disclosure below may be understood as the operations of the processor 680. Further, in the present disclosure, for example, even at least some of operations described as the operations of the "electronic device" may be understood as the operations of the processor 680.

The server 602 may communicate with the electronic device 601 through the network 635. The server 602 may provide a plurality of templates provided by various developers or users. The server 602 may be operated based on a technology such as artificial intelligence (AI) including various technologies, for example, machine learning.

According to an embodiment, the server 602 may extract a task by analyzing a user input (e.g., an NL input) received from the electronic device 601 and may provide a template associated with the task to the electronic device 601. According to various embodiments, the server 602 may add or modify an item included in the template by using information retrieved through the network 635.

Figure 7A:
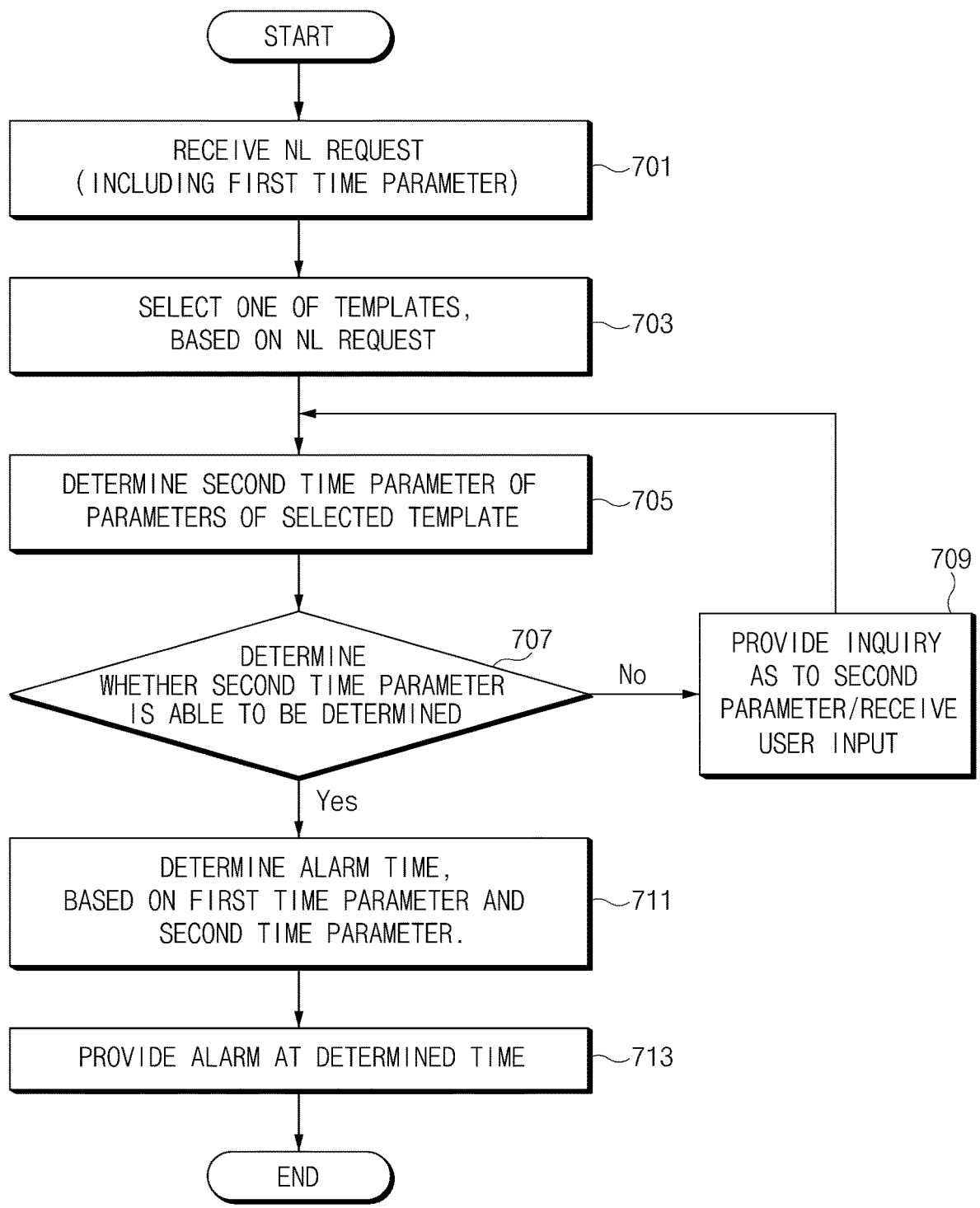
FIG. 7A and FIG. 7B are flowcharts illustrating a method for setting up an alarm, according to various embodiments.

FIG. 7A is a flowchart illustrating a method for setting up an alarm, according to an embodiment.

Referring to FIG. 7A, according to an embodiment, the method for setting up the alarm may include operation 701 to operation 713. For example, operation 701 to operation 713 may be performed by the electronic device 601 illustrated in FIG. 6. Each of operations 701 to 713 may be, for example, implemented with instructions which may be executed by the processor 680 of the electronic device 601. The instructions may be, for example, stored on a computer-readable recording medium and the memory 670 of the electronic device 601 illustrated in FIG. 6. Hereinafter, the description on operation 701 to 713 will be made by using reference numerals of FIG. 6.

In operation 701, according to an embodiment, the processor 680 may receive, via a UI (or an input device), an NL request to set up an alarm. The NL request may include a first time parameter associated with a time selected by a user. The NL request may have a text or voice format.

In certain embodiments, the NL request can be detected by use of certain trigger words such as "alarm", "reminder", or "schedule." Following the trigger word, the electronic device may detect a spoken grammatical verb followed by an article, such as "going to work", "travel to Seoul", and "go to Dr. Appointment" and a time. Additionally, from the NL request, the electronic device may detect a location that is contextual "work", "home", or geographical "Suwon, KR", "Seoul KR", and a term suggestive of transportation means, such as a car, public transportation, or flight.

In operation 703, according to an embodiment, the processor 680 may select one of the plurality of templates, based at least partly on the NL request received in operation 701. Each of the templates may include a plurality of parameters (or items). In some embodiments, the templates may be chosen on the basis of the detected verb and following article.

In operation 705, according to an embodiment, the processor 680 may determine a second time parameter of the plurality of parameters (items) of the selected template, based at least partly on data stored on the memory 670 and/or data received from an external electronic device (e.g., the server 602) through the network 635.

In operation 707, according to an embodiment, the processor 680 may determine whether the second time parameter is able to be determined or has been determined. The processor 680 may proceed to operation 711 when the second time parameter has been determined. Otherwise, the processor 680 may proceed to operation 709.

In operation 709, according to an embodiment, since the second time parameter is not able to be determined, based at least partly on the data, the processor 680 may provide a guide or inquiry as to the second parameter via the UI (e.g., the display 640), and may receive an NL input via the UI in response to the provided inquiry. The processor 680 may determine the second time parameter, based at least partly on the received NL input.

In operation 711, according to an embodiment, the processor 680 may determine a time for the alarm, based at least partly on the first time parameter and the second time parameter.

In operation 713, according to an embodiment, the processor 680 may provide the alarm at the determined time via the UI. For example, the processor 680 may determine at least one of a pattern, frequency, or sound level of the sound or vibration alarm generated from the audio output module 651. In addition, the processor 680 may provide the alarm by using the at least one of the pattern, the frequency, or the sound level via the UI.

Figure 7B:
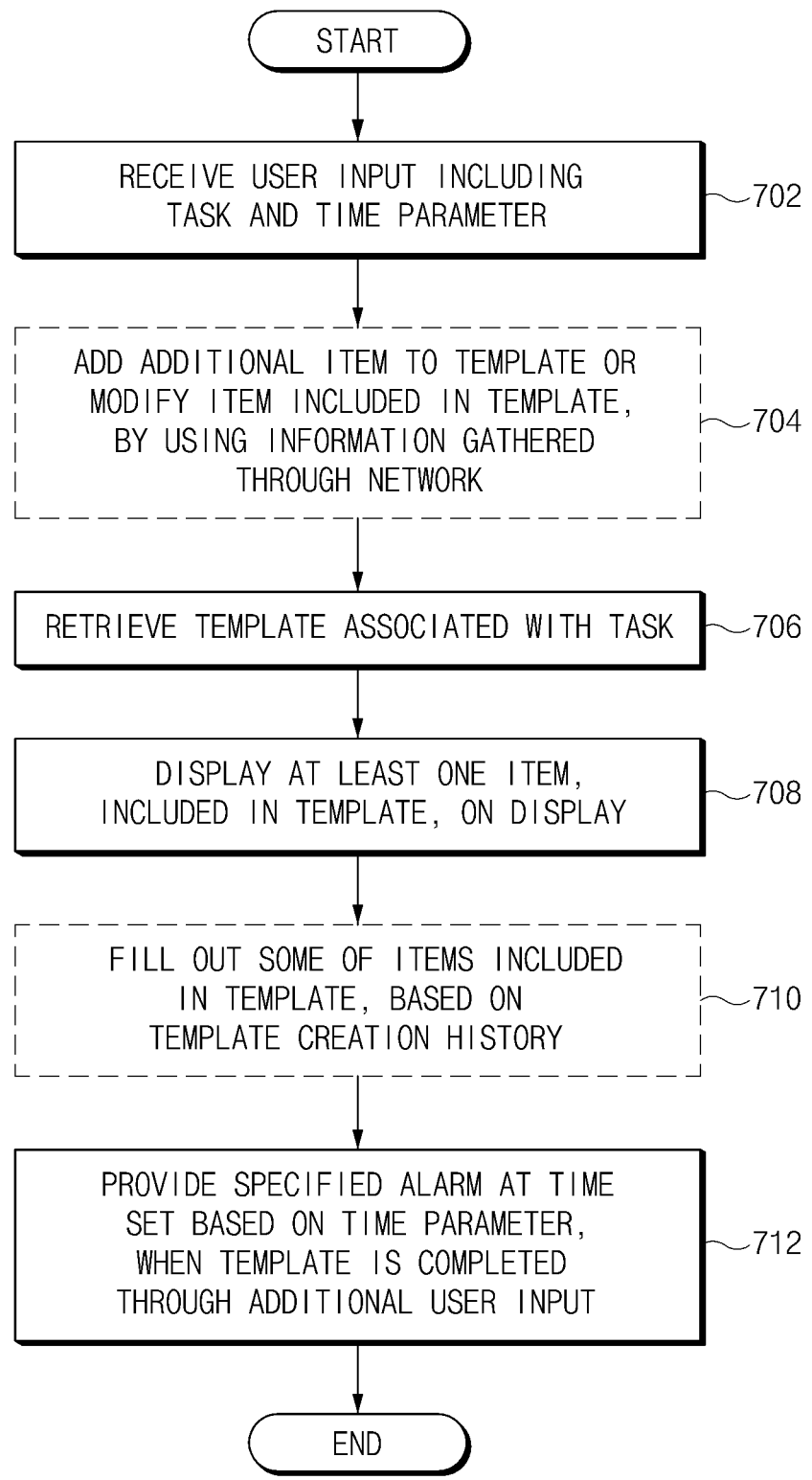

FIG. 7B is a flowchart illustrating a method for setting up an alarm, according to another embodiment.

Referring to FIG. 7B, according to an embodiment, the method for setting up the alarm may include operations 702 to 712. For example, operation 702 to operation 712 may be performed by the electronic device 601 illustrated in FIG. 6. Each of operations 702 to 712 may be, for example, implemented with instructions which may be executed by the processor 680 of the electronic device 601. The instructions may be, for example, stored on a computer-readable recording medium or the memory 670 of the electronic device 601 illustrated in FIG. 6. Hereinafter, the description on operation 702 to 712 will be made by using reference numerals of FIG. 6.

In operation 702, according to an embodiment, the processor 680 may receive, through an input device (e.g., the touch screen panel or the audio input module 653), the input of a user who intends to set up an alarm. For example, the user input may include a task parameter representing a work (that is, task) to be performed by a user at a specified time and a time parameter representing the specified time. The user input may include an NL input and may have a text or voice format depending on an input device receiving the user input.

In operation 704, according to an embodiment, the processor 680 may transmit the user input to the server 602 through the communication circuit 630. The server 602 may specify a template corresponding to the user input, based on the user input. The server 602 may add an additional item to the specified template or may modify an existing item in the specified template, by using information retrieved through the network 635.

When the electronic device 601 receives the template corresponding to the user input from the server 602 in operation 706, operation 704 may be performed in the server 602. When the electronic device 601 retrieves the template from the memory 670, operation 704 may be omitted.

In operation 706, according to an embodiment, the processor 680 may retrieve the template associated with the task included in the user input. For example, the processor 680 may extract the task by analyzing the user input and may retrieve the template, which is associated with the task, from the memory 670. For example, after a trigger word like "alarm", the processor 680 may determine the task by detecting a grammatical verb followed by an article. In this case, the server 680 may add an additional item to the retrieved template or may modify an existing item in the retrieved template, by using information retrieved through the network 635. In other words, when retrieving the template corresponding to the user input from the memory 670, operation 704 may be performed after operation 706.

According to various embodiments, the processor 680 may transmit the user input to the server 602 through the communication circuit 630 and may retrieve the template, which is associated with the task, from the server 620 in response to the transmission of the user input, in operation 706. In this case, a template having a certain item, which is added to the template or modified, may be retrieved from the server 620.

In operation 708, according to an embodiment, the processor 680 may display at least one of a plurality of items included in the retrieved template, which is retrieved in operation 706, on the display 640. The processor 680 may fill out the item displayed on the display 640 by using the input device provided in the electronic device 601.

In operation 710, according to an embodiment, the processor 680 may automatically fill out some of the plurality of items included in the template, based on data on a template creation history of the user, which is stored on the memory 670. When the data on a template creation history of the user is absent from the memory 670 or an automatic fill-out function is disabled by the user, operation 710 may be omitted.

In operation 712, when the template is completed by an additional input from the user, the processor 680 may provide, for the user, a specified alarm for the user at a time set based on a time parameter included in the user input which is received in operation 702. According to an embodiment, the time set based on the time parameter may be the same as a time represented by the time parameter or may be adjusted based on information included in the template. According to an embodiment, providing a specified alarm may include displaying a UI screen, in which the completed template is reflected, on the display 640, generating a specified sound by the audio output module 651, and/or generating a vibration by the actuator 660.

Figure 8:
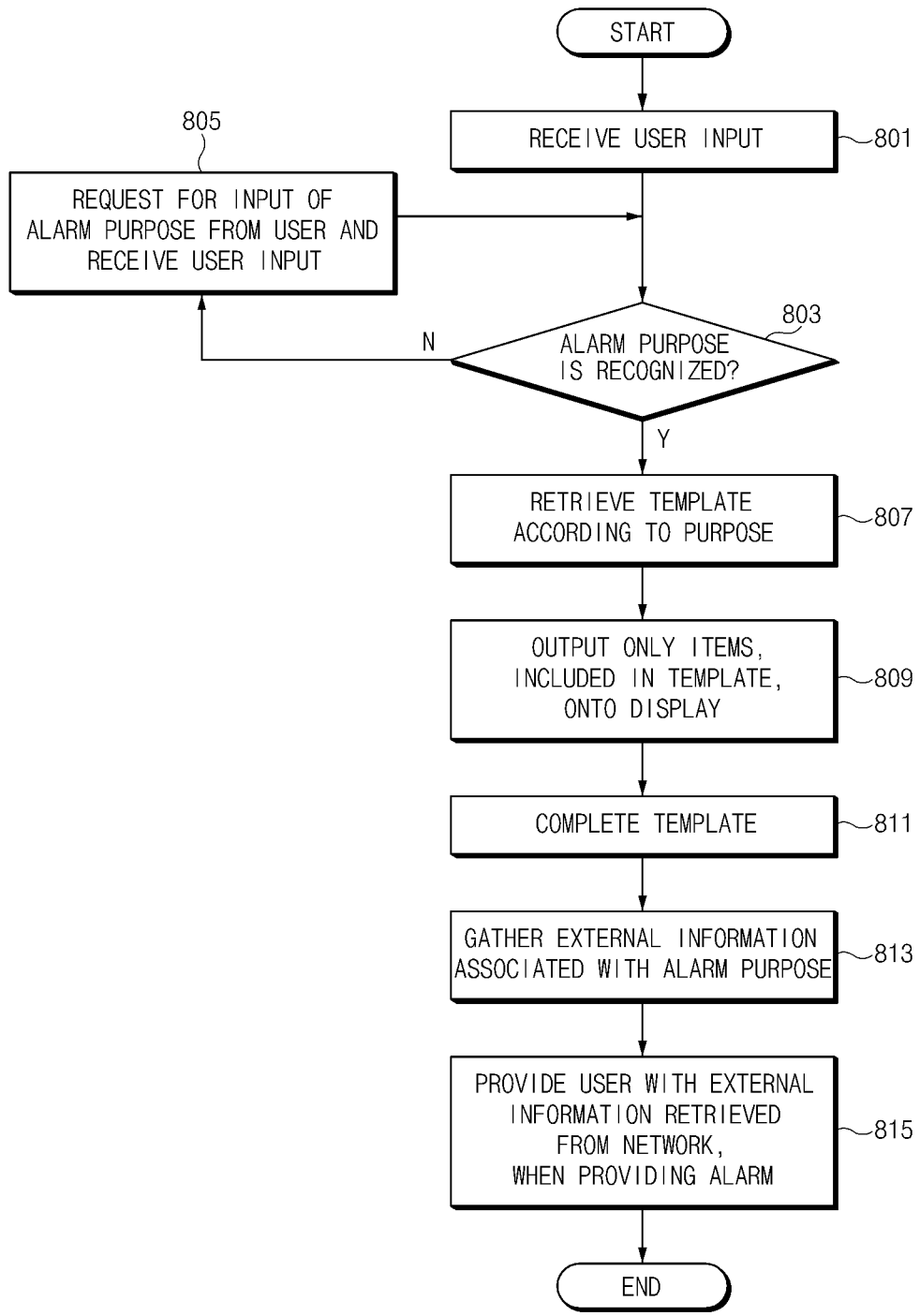
FIG. 8 is a flowchart illustrating a method for setting up an alarm, according to an embodiment.

FIG. 8 is a flowchart illustrating a method for setting up an alarm, according to another embodiment.

Referring to FIG. 8, according to an embodiment, the method for setting up the alarm may include operations 801 to 815. For example, operation 801 to operation 815 may be performed by the electronic device 601 illustrated in FIG. 6. Each of operations 801 to 815 may be, for example, implemented with instructions which may be performed (or executed) by the processor 680 of the electronic device 601. The instructions may be, for example, stored on a computer-readable recording medium or the memory 670 of the electronic device 601 illustrated in FIG. 6. Hereinafter, the description on operation 801 to 815 will be made by using reference numerals of FIG. 6.

In operation 801, according to an embodiment, the processor 680 may receive, through the input device (e.g., the touch screen panel or the audio input module 653), the input of the user who intends to set up (or, register) the alarm. The user input may include an alarm purpose (that is, a task), and a time parameter representing an alarm setting time.

In operation 803, according to an embodiment, the processor 680 may determine whether the alarm purpose is recognized. The processor 680 may determine whether the purpose of the user, who intends to set up the alarm, is appropriately recognized, by analyzing the user input (e.g., the NL input) received through the input device. The processor 680 may proceed to operation 807 when the alarm purpose is recognized. Otherwise, the processor 680 may proceed to operation 805.

In operation 805, according to an embodiment, since the processor 680 does not recognize the alarm purpose, the processor 680 may provide a guide allowing the user to input the alarm purpose. The user may input a user input, which includes the alarm purpose, into the electronic device 601 by referring to the guide.

In operation 807, according to an embodiment, since the processor 680 recognizes the alarm purpose, the processor 680 may retrieve the template according to the alarm purpose from the memory 670 of the electronic device 601 or the server 602. As noted above, in some embodiments, the alarm purpose can be determined by detecting a grammatical verb and article.

In operation 809, according to an embodiment, the processor 680 may output items included in the template on the display 640.

In operation 811, the user may complete the template by filling out the items output onto the display 640 in operation 809. The completing of the template refers to filling out at least one item necessary for performing a specified function, and does not refer to essentially filling out all items included in the template.

In operation 813, according to an embodiment, the processor 680 may retrieve external information, which is associated with the alarm purpose, through the network 635. For example, when the alarm purpose is in traveling, the external information may include weather situations and traffic situations.

In operation 815, according to an embodiment, the processor 680 may provide a specified alarm at an alarm setting time. The alarm setting time may be determined based on the time parameter included in the user input received in operation 801. According to an embodiment, the alarm setting time may be adjusted based on the external information retrieved in operation 813. According to another embodiment, the processor 680 may provide the external information, which is retrieved in operation 813, for the user when providing the alarm.

FIG. 9 is a view illustrating the method for setting up the alarm, according to an embodiment.

For example, FIG. 9 illustrates UI objects 901 to 905 which may be output onto the display 640 of the electronic device 601 illustrated in FIG. 6.

According to an embodiment, the user may input the user input, which is to set up the alarm, into the electronic device. The electronic device may extract a task (alarm purpose), a time parameter, or other information from the user input by using a specified application (e.g., the alarm application). Thereafter, the electronic device may register the alarm, the task, and other information at the time represented by the time parameter.

For example, when the user utters "Alarm!, Tomorrow I'm going to go to work by car from Suwon to Seoul, wake me up at 6:30 a.m.", the electronic device may extract, from a NL, "6:30 a.m." serving as the time parameter, "go to work" serving as a task, "car" serving as a transportation, "Suwon" serving as a departure point, or "Seoul" serving as a destination. The electronic device 601 may detect "alarm" as a trigger word and set an alarm based on the extracted information and may display the UI object 901 illustrated in FIG. 9 on an execution screen of the specified application. According to an embodiment, the electronic device may retrieve an alarm template, on the basis of grammatical verb "go" and article "to work" appropriate to the "go to work" (task) from the memory or the server in background. Additionally, the electronic device may detect the time "6:30 am" and locations "Suwon" and "Seoul."

According to an embodiment, the user may input a user input, which is to modify the previous setting-up of the alarm, into the electronic device. The user input may include, for example, a touch input and/or a NL input. Referring to the UI object 902, for example, the transportation set to the car may be modified to a train by the user input (e.g., a user input of "change the transportation to a train.")

When the transportation is modified from the car to the train or other vehicle that is commonly used for public transportation (bus, subway), the electronic device may display, on the display, at least one item, which is associated with the train, of a plurality of items included in the alarm template which is previously retrieved. For example, referring to the UI object 903, the electronic device may display, on the display, a time table and fares of trains departing from origination, Suwon to destination Seoul after the detected time, 6:30 a.m., which serve as items associated with the train. The user may select one of the items associated with the train. For example, the user may select a Saemaeul train item, which departs from Suwon at 7:00 a.m. and arrives at Seoul at 7:30 a.m., among the items associated with the train. Although not illustrated in FIG. 9, according to various embodiments, the electronic device 601 may support ticketing for the Saemaeul train together with a train ticketing application.

Referring to the UI object 904, the electronic device 601 may display an item for verifying the selected train and may advance the alarm time (6:30 a.m.) by, for example, one hour, based on the time parameter included in the user input. In other words, when the train is fixed, the electronic device may predict that an additional time is taken for the user to move to a train station (Suwon) and thus may set the alarm time from 6:30 a.m. to 5:30 a.m. again.

In addition, according to an embodiment, the electronic device may additionally display an item, which is to set up a notification before the user arrives at the destination (e.g., setting up of notification before arrival), of the plurality of items included in the alarm template. When the user wants to receive a notification before arriving at the destination, the user may select a relevant item. When an item for the setting up of the notification before arrival is selected, the UI object 905 may be displayed. The UI object 905 may include items for a task (alarm purpose), a destination, a departure point, and a train and may additionally include an item set up to provide an alarm before two minutes and four minutes from the arrival at the destination (Seoul). According to an embodiment, the electronic device 601 may automatically set up an alarm time based on a template creation history of the user, which is stored on the memory. For example, when there is a history that alarms are set before two minutes and four minutes from the final alarm time when the user sets up an alarm for "go to work", the electronic device may automatically set up alarms two minutes before (5:28 a.m.) and four minutes before (5:26 a.m.) the final alarm time (5:30 a.m.), the electronic device may set up similar alarms. In certain embodiments, statistical analysis can be used. For example, if the user during the last three times or eight of the last ten times has set the alarm for "go to work" a same amount of time in advance, the electronic device similarly sets an alarm at the earlier time.

Figure 10:
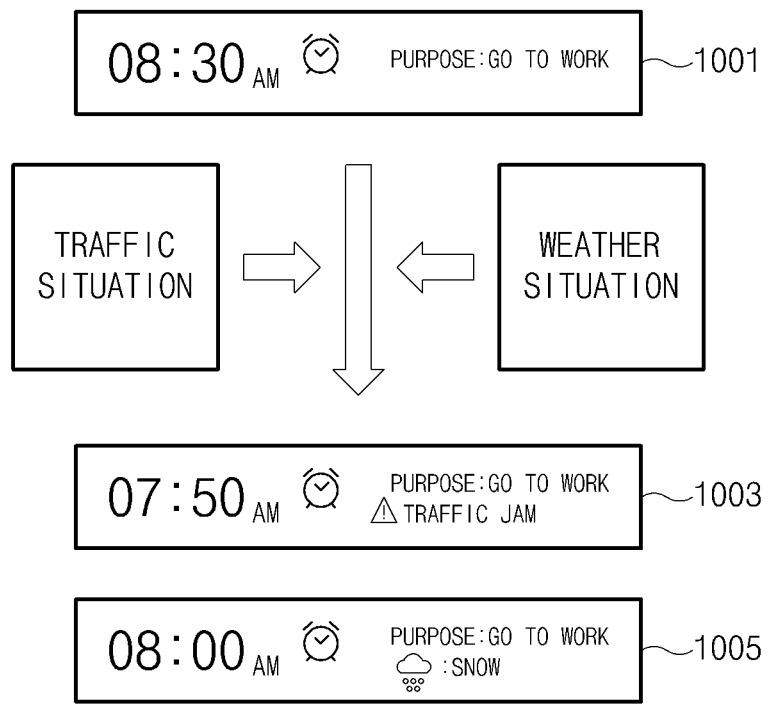
FIG. 10 is a view illustrating that an alarm setting item is adjusted, according to an embodiment.

FIG. 10 is a view illustrating that an alarm setting item is adjusted, according to an embodiment.

For example, FIG. 10 illustrates UI objects 1001 to 1005 which may be output onto the display 640 of the electronic device illustrated in FIG. 6.

Referring to the UI object 1001, the electronic device may set up an alarm at 8:30 a.m., based on a user input. For example, an alarm purpose (a task) included in the user input is "go to work", and a time parameter included in the user input may represent "8:30 a.m.". The electronic device may retrieve a template associated with the alarm purpose ("go to work").

According to an embodiment, the electronic device may retrieve external information associated with the alarm purpose ("go to work") from a network. For example, the electronic device may retrieve information such as a weather situation and a traffic situation. The electronic device may adjust an item for a notification time (8:30 a.m.) based on the retrieved information.

For example, referring to the UI object 1003, the electronic device 601 may collect information on the traffic situation (or scheduling delays with public transportation) and may advance the preset alarm time (8:30 a.m.) by 40 minutes. The electronic device 601 may set the alarm time to 7:50 a.m. by considering the traffic situation or scheduling delay (e.g., traffic jam, or, for example, a train delay due to equipment failure).

For another example, referring to the UI object 1005, the electronic device may retrieve information on the weather situation and may advance the preset alarm time (8:30 a.m.) by 30 minutes. Accordingly, the electronic device may set the alarm time to 8:00 a.m. again by considering the weather situation (e.g., snow).

FIGS. 11A to 11J are views illustrating that the method for setting up an alarm is implemented to be performed together with an interactive application, according to an embodiment.

According to an embodiment, the method for setting up the alarm may be implemented on the interactive application. The interactive application may include, for example, a chat bot application, a voice recognition application (e.g., S-Voice™), or an artificial intelligence secretary application, running together with a messenger application.

Figure 11A:
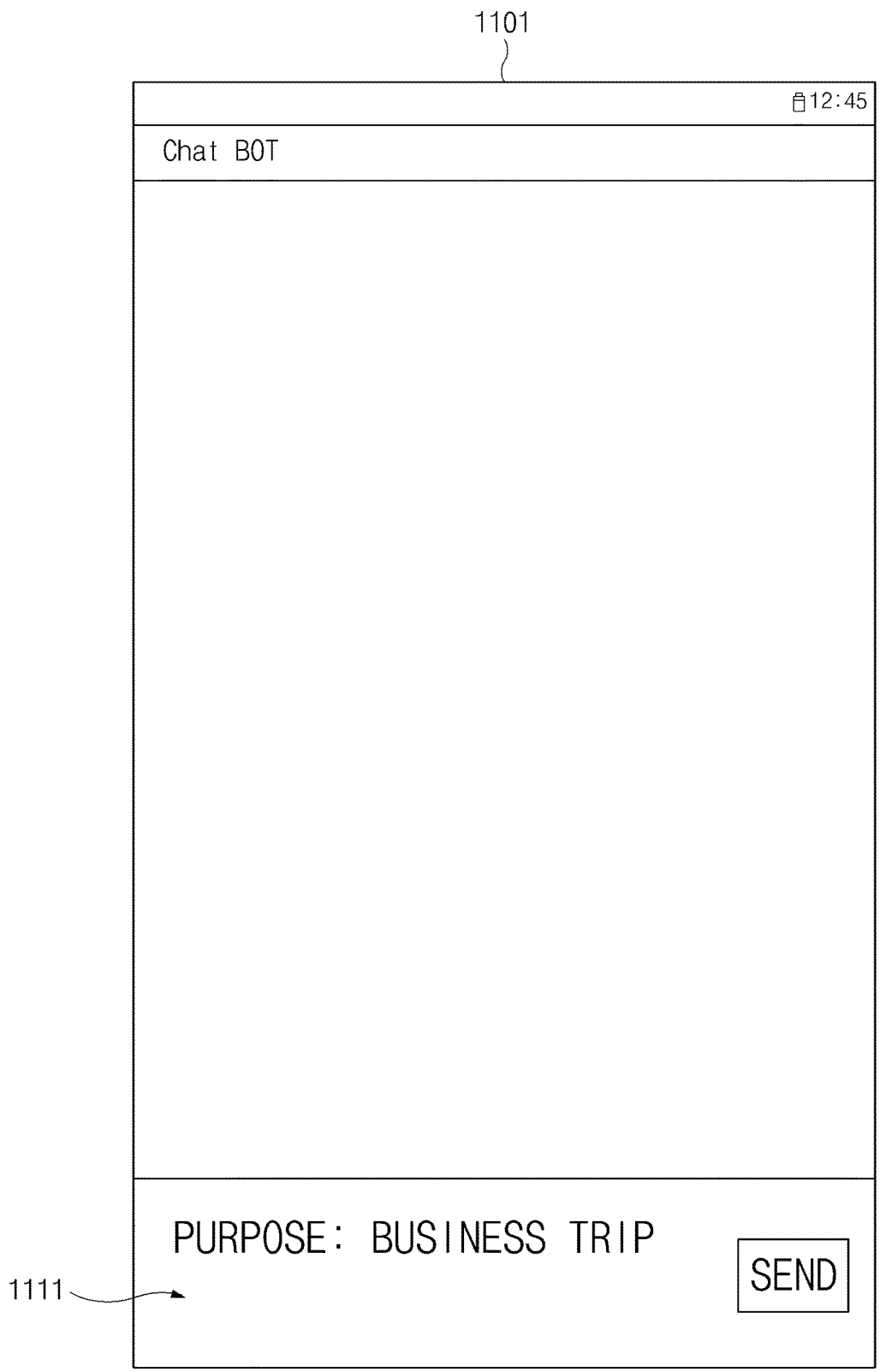
FIG. 11A, FIG. 11B, FIG. 11C, FIG. 11D, FIG. 11E, FIG. 11F, FIG. 11G, FIG. 11H, FIG. 11I and FIG. 11J are views illustrating that a method for setting up an alarm is implemented to be performed together with an interactive application, according to an embodiment.

Referring to FIG. 11A, the electronic device may execute the interactive application. As the interactive application is executed, the electronic device may display a screen 1101 on the display. The user may provide a user input, which is to set up the alarm, into the electronic device. For example, the user may input an NL of "Alarm! Business trip at 8:30 a.m." The term "Business Trip" and "8:30 am" may be detected. "Business Trip" may be entered into an input field 1111 included in the screen 1101. The NL may be input into the input field 1111 in a text or voice format.

Figure 11B:
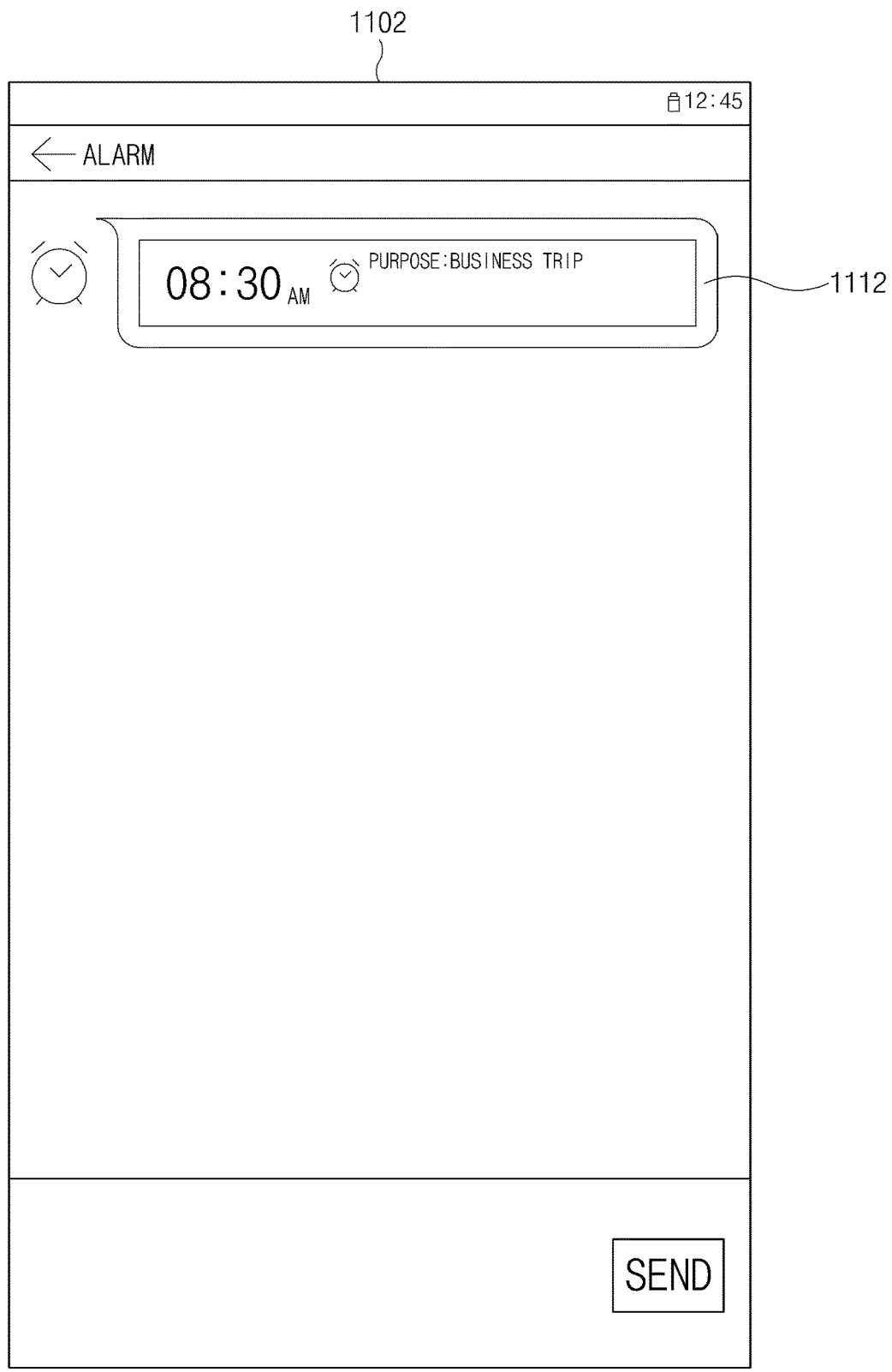

Referring to FIG. 11B, the electronic device may display a screen 1102 on the display as the user input of "Alarm! Business trip at 8:30 a.m." is confirmed. The electronic device may extract an alarm purpose (e.g., business trip) and a time parameter (e.g., 8:30 a.m.) from the NL and may set up an alarm for the business trip at 8:30 a.m. The alarm may be included in the screen 1102 as illustrated in an UI object 1112. In addition, although not illustrated in FIG. 11B, the electronic device may retrieve a template associated with the alarm purpose from the memory or the server as the user input is confirmed.

Figure 11C:
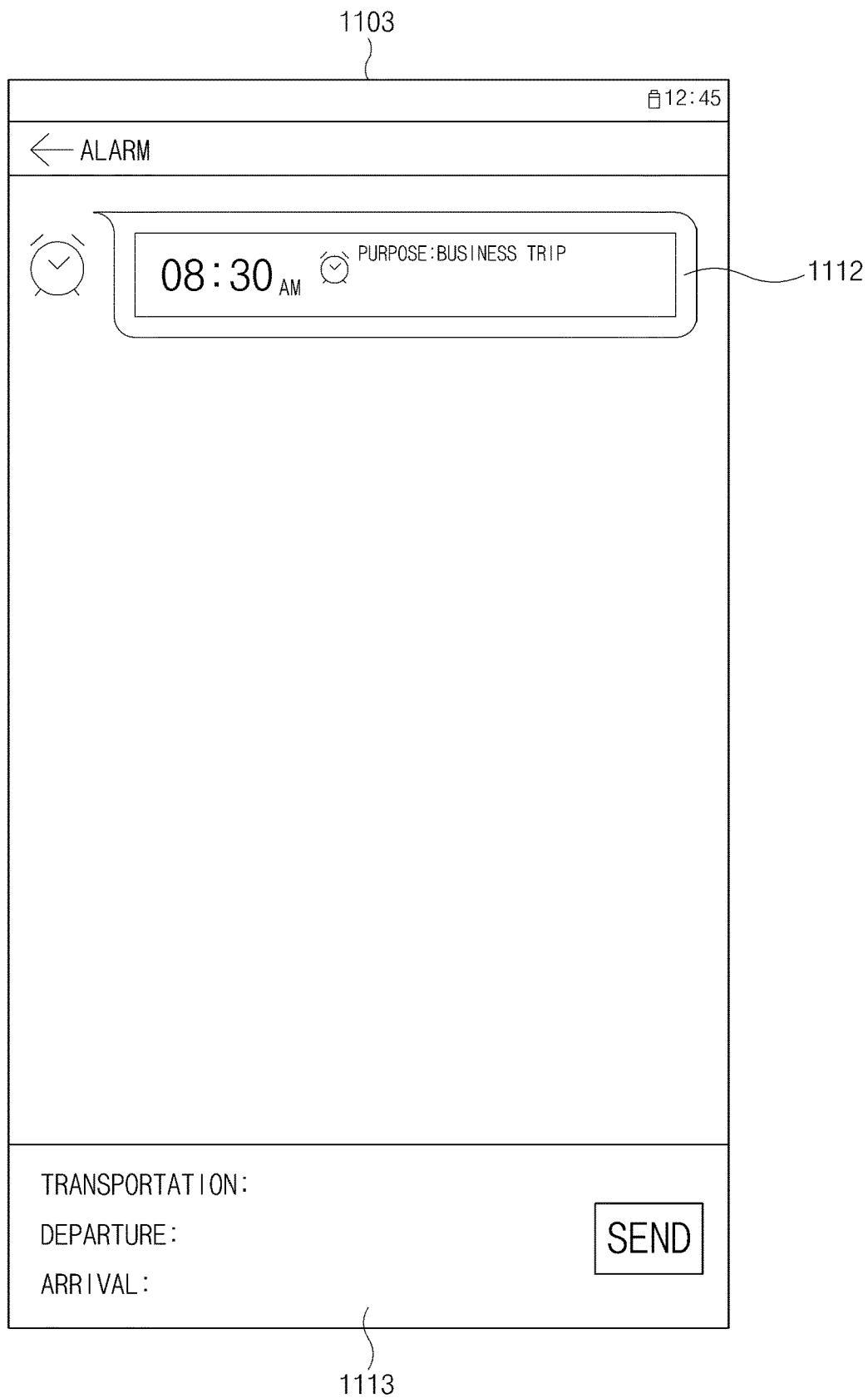

Referring to FIG. 11C, the electronic device may provide, to an input field 1113 included in a screen 1103, items necessary for accomplishing the alarm purpose (e.g., a business trip) among various items included in the retrieved template. For example, the electronic device may provide, to the input field 1113, items to prompt a user such that the user inputs a transportation necessary for the business trip, a departure point, and a destination. The user may input the items using either voice input or a virtual keyboard.

Figure 11D:
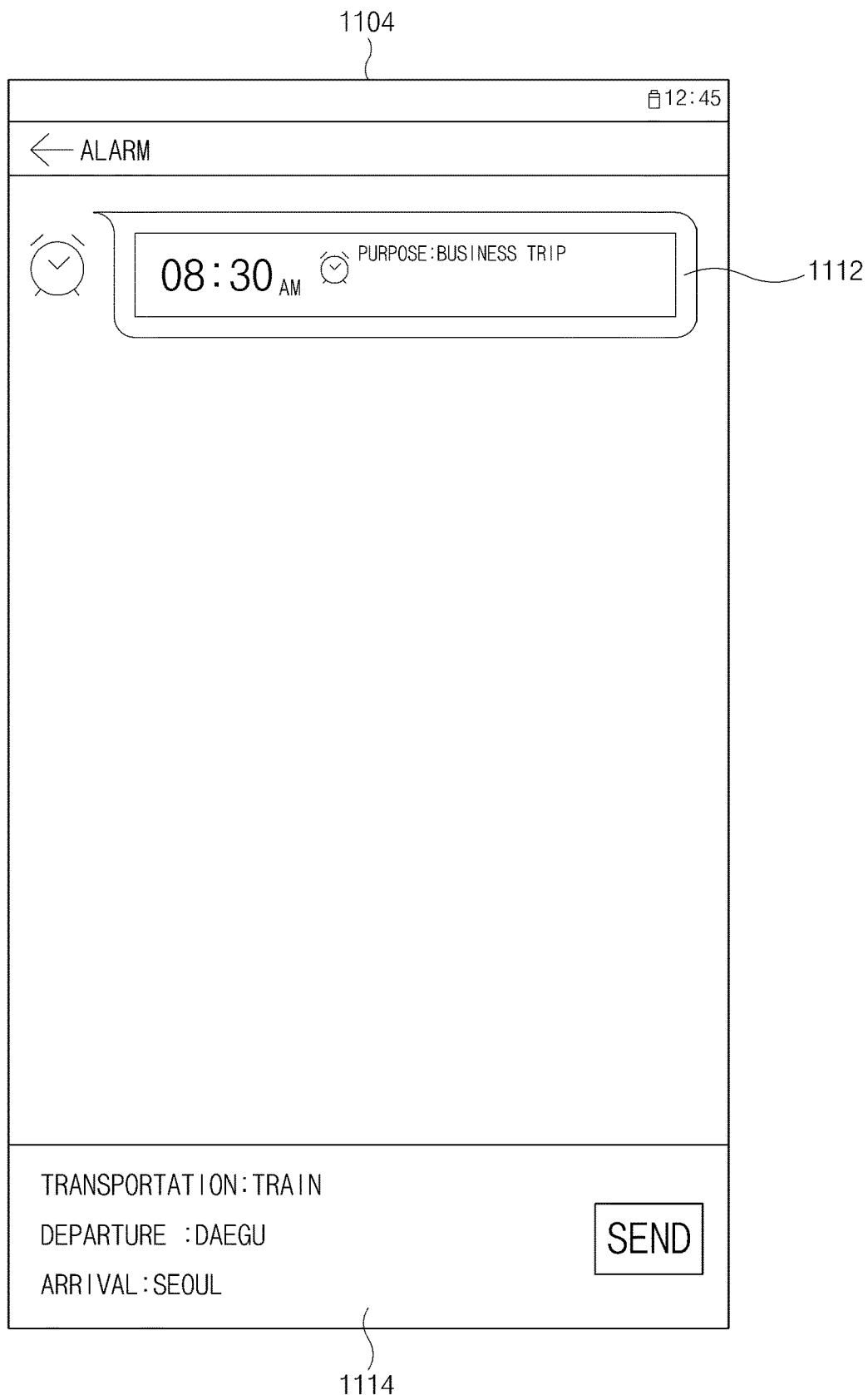

Referring to FIG. 11D, the electronic device may display, on the display, a user input received in a text or voice. For example, the user may provide information on the transportation (e.g., a train) necessary for the business trip, a departure point (e.g., Daegu), and a destination (e.g., Seoul) to the electronic device in a text or voice. The electronic device may display, on an input field 1114 included in a screen 1104, a train as the input transportation, Daegu as the departure point, and Seoul as the destination.

Figure 11E:
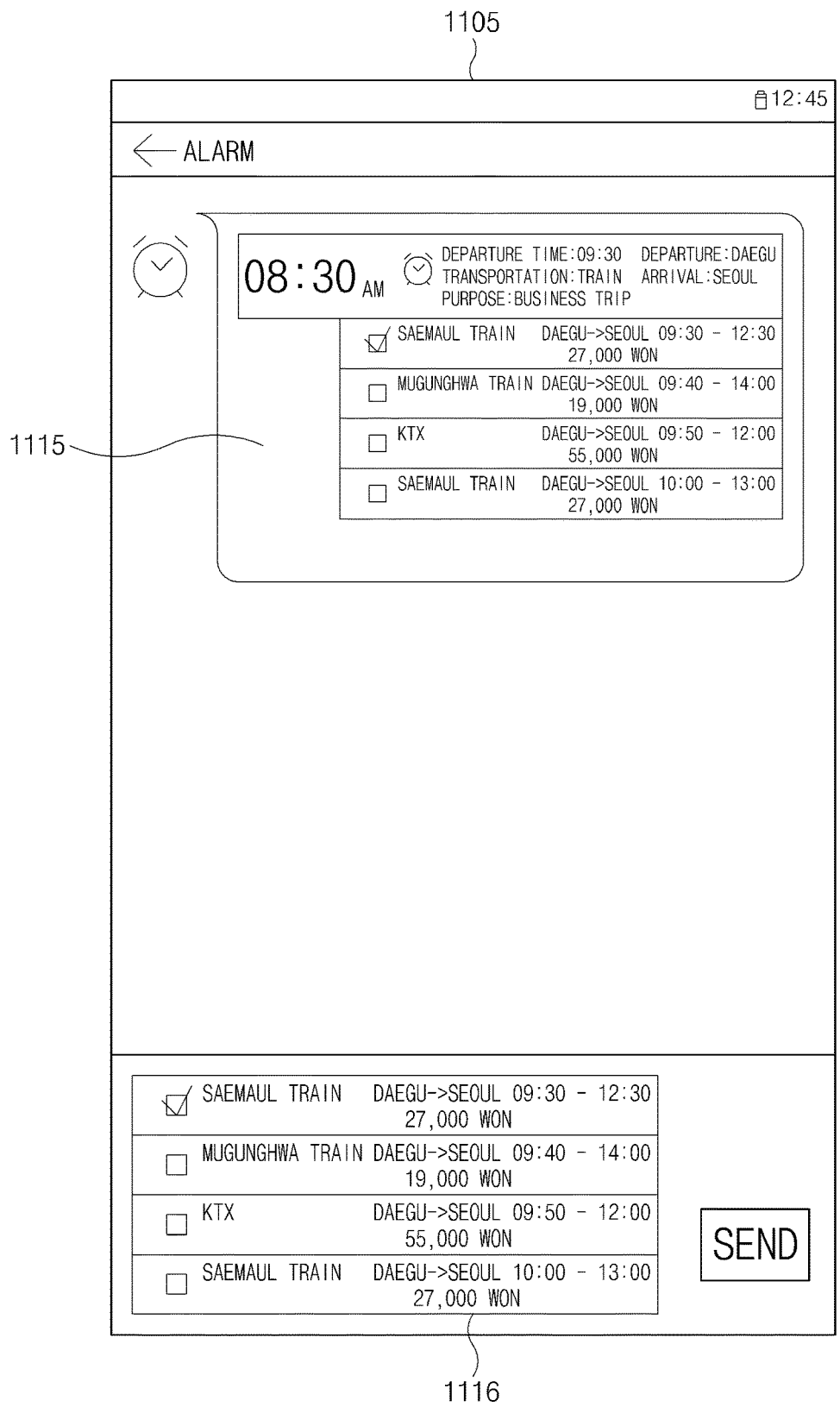

Referring to FIG. 11E, since the train, Daegu, and Seoul are designated as the transportation, the departure point, and the destination, respectively, information on the transportation for moving from the departure point to the destination may be retrieved from a network. For example, referring to a screen 1105, the electronic device may retrieve information (e.g., a departure time, an arrival time, or fares) on trains running from the departure point to the destination. The electronic device may output a UI object 1115 representing the retrieved information, and may provide, to an input field 1116, an item (e.g., checkbox) allowing a user to select one of the trains.

Figure 11F:
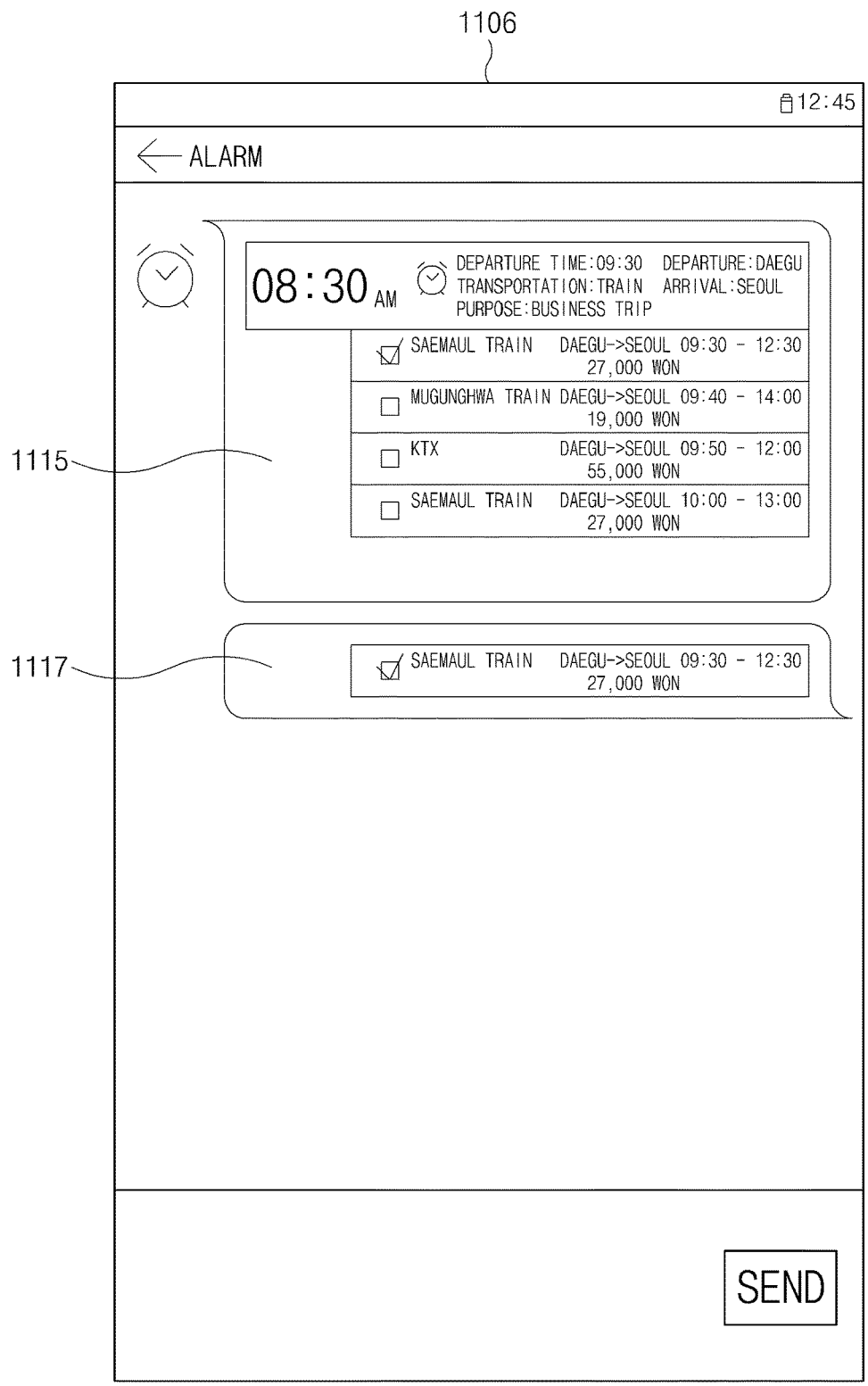

Referring to FIG. 11F, a screen 1106 may be displayed on the display when the user selects a Saemaul train (the departure time: 9:30 a.m.; the arrival time: 12:30 p.m.; a fare: 27,000 won). When the user selects the Saemaul train, the electronic device may additionally display, on the display, a UI object 1117 for confirming the selection of the user.

Figure 11G:
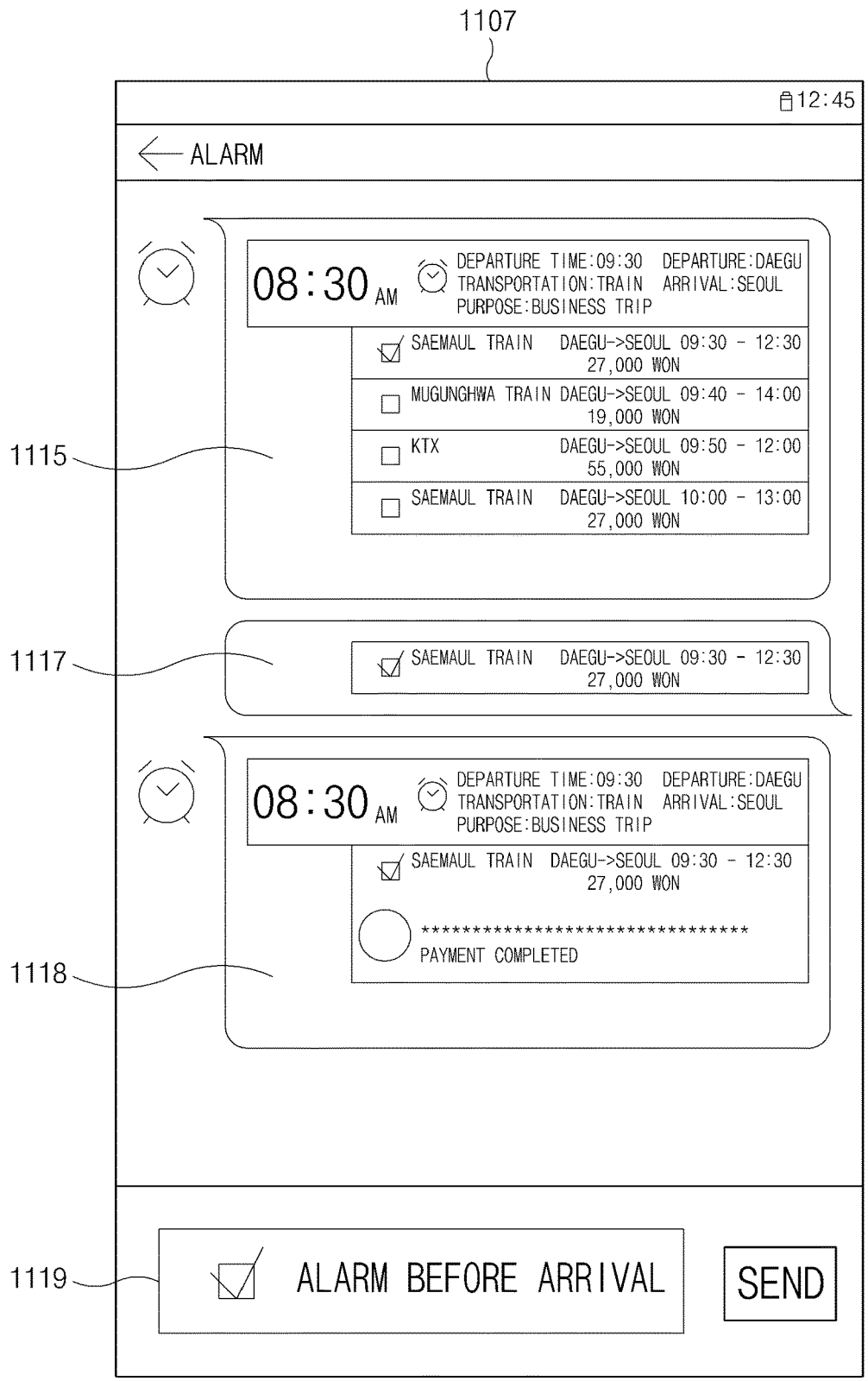

Referring to FIG. 11G, the electronic device may support ticketing and payment for the selected Saemaul train, together with a ticketing application. For example, referring to a screen 1107, the electronic device may additionally display, on the display, a UI object 1118 for confirming the ticketing and the payment when the ticketing and the payment are completed. In addition, the electronic device may display, on an input field 1119 included in the screen 1107, an item for an inquiry as to receiving an alarm before the Saemaul train arrives at the destination (e.g., Seoul).

Figure 11H:
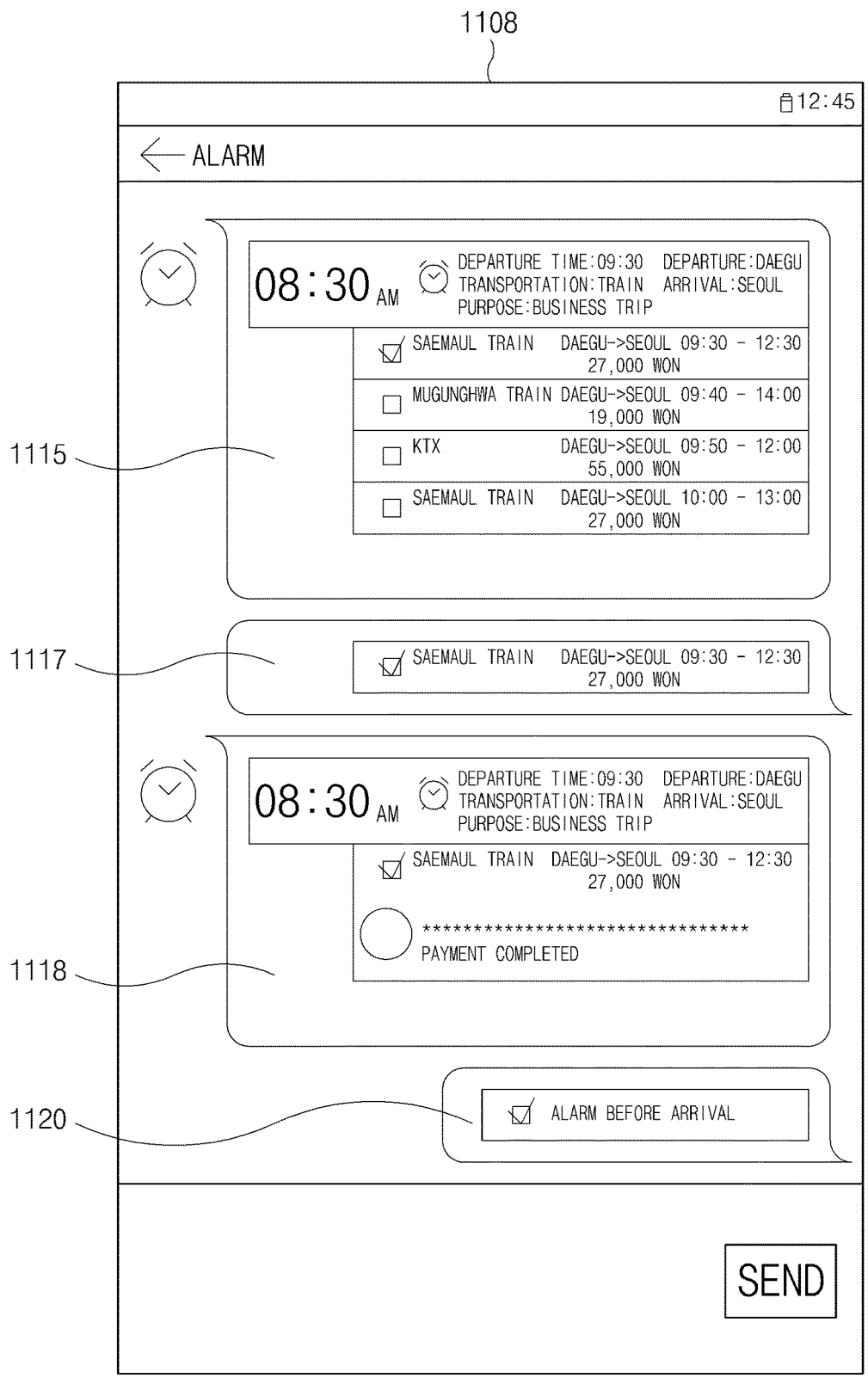

Referring to FIG. 11H, when the user selects receiving the alarm before arriving at the destination (e.g., Seoul), the electronic device may output, onto the display, a UI object 1120 for confirming the selection of the user (user input), as illustrated in a screen 1108.

Figure 11I:
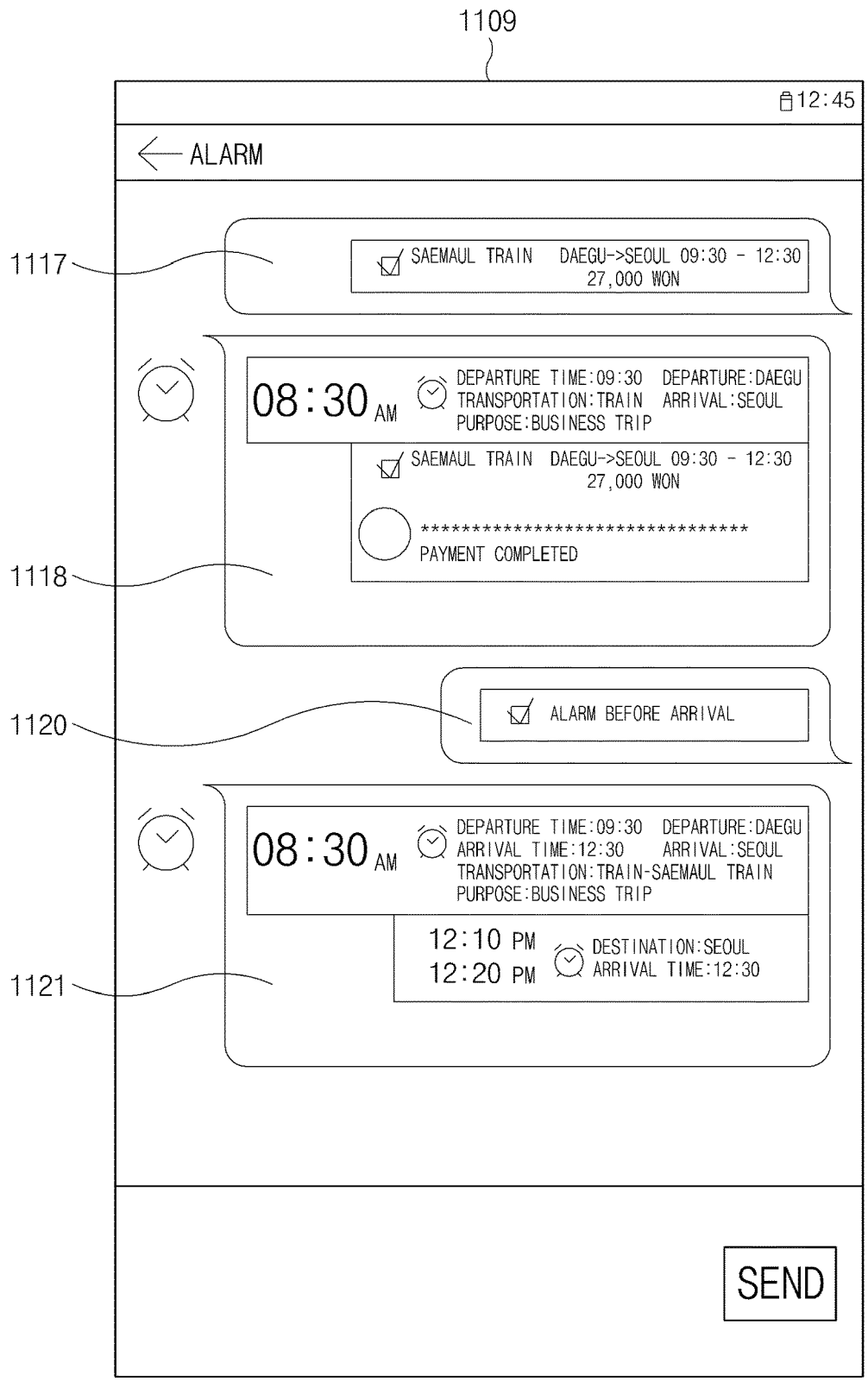

Referring to FIG. 11I, the electronic device may register a subject alarm to provide the alarm for the user before arrival at the destination (e.g., Seoul). For example, the electronic device may register an alarm such that the alarm is provided before 10 min. and 20 min. from the arrival time (12:30 p.m.) at the destination (e.g., Seoul). The electronic device may output, on the display, a UI object 1121 representing the registration of the alarm before the arrival at the destination, as illustrated in a screen 1109.

Figure 11J:
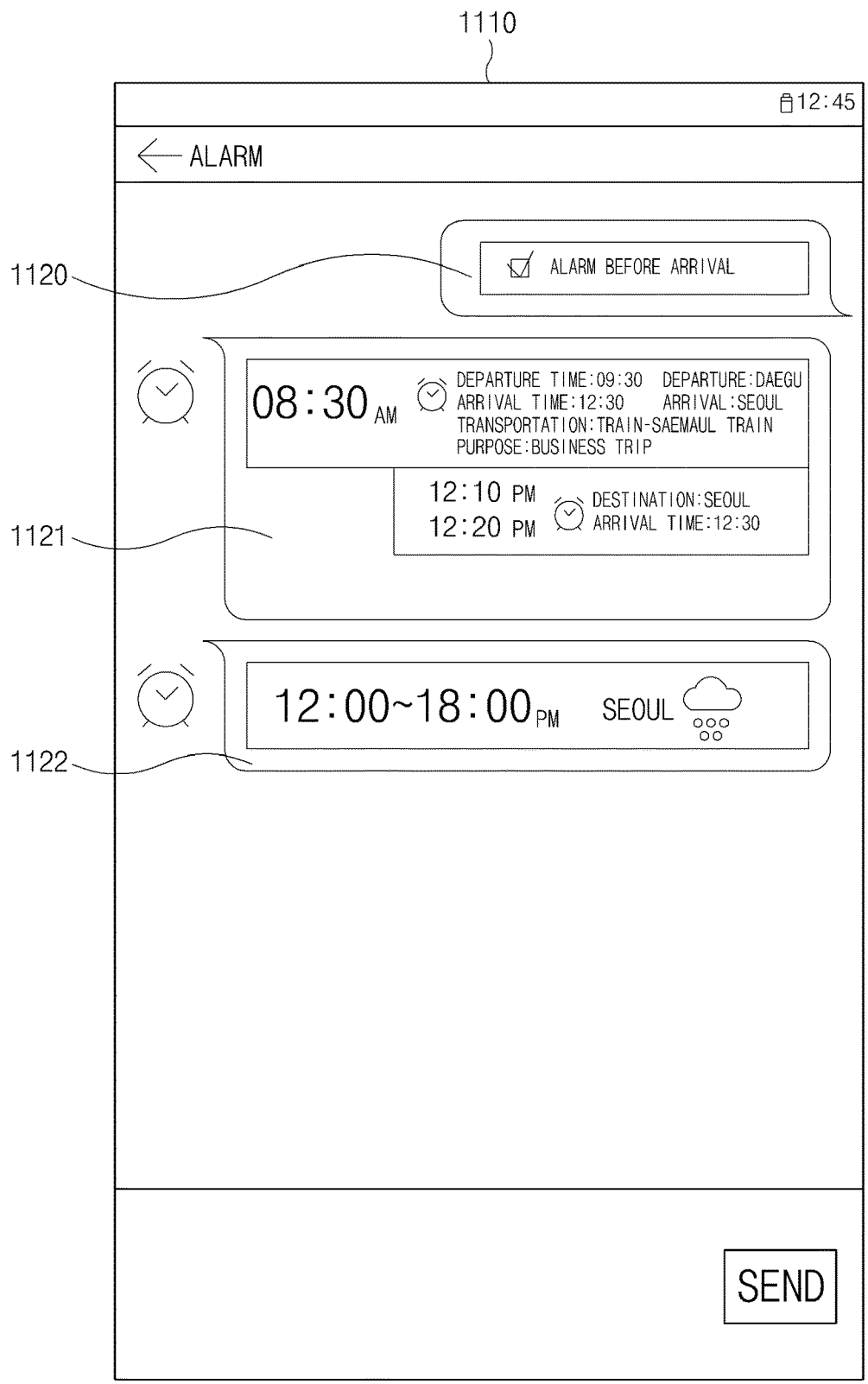

Referring to FIG. 11J, the electronic device may provide additional information based on external information retrieved from a network. For example, referring to a screen 1110, the electronic device may retrieve information on a weather situation (e.g., snowing from 12:00 p.m. to 6:00 p.m.) at the destination (Seoul) of the business trip and may provide, for the user, the retrieved information as a UI object 1122.

Figure 12:
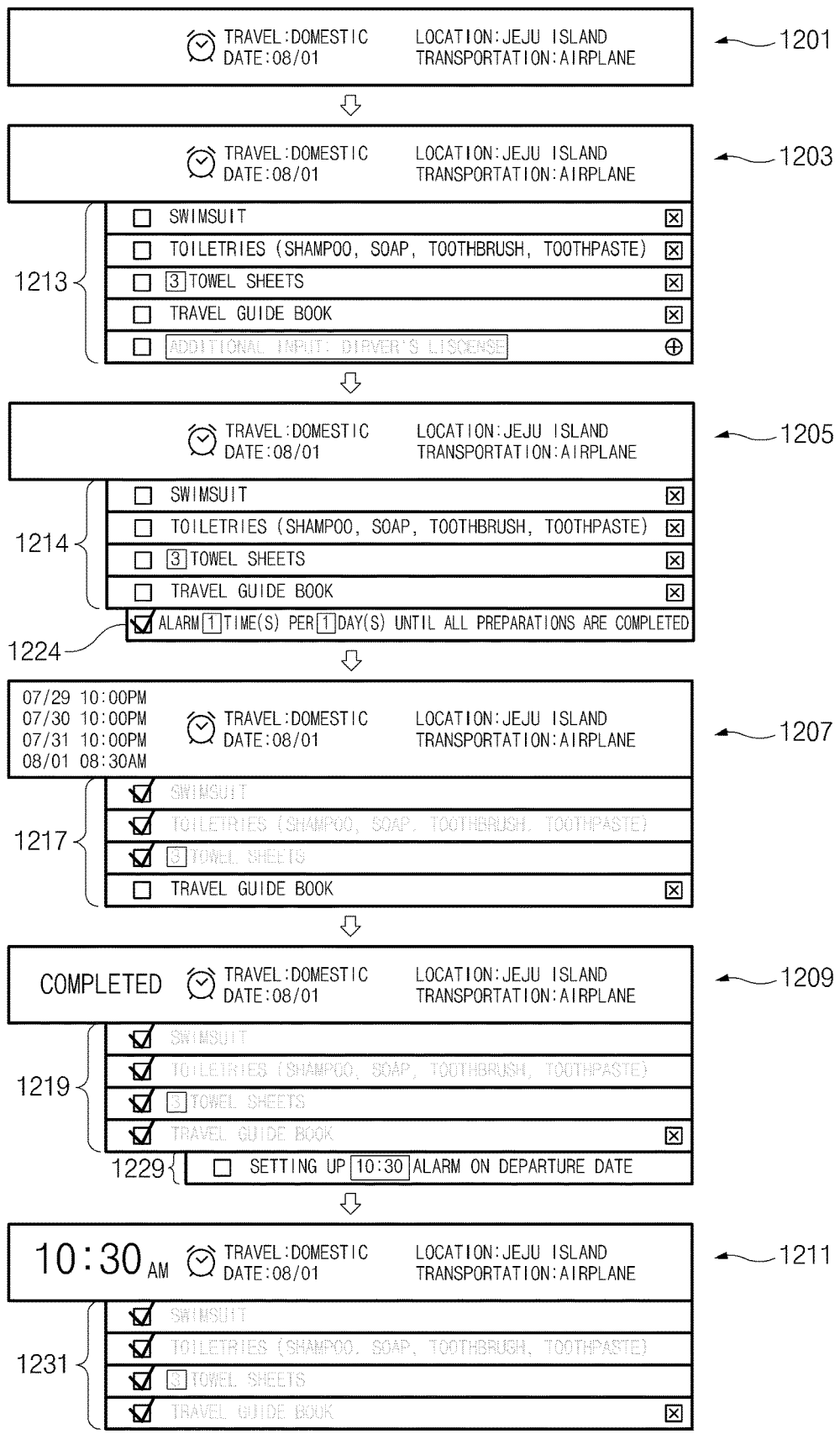
FIG. 12 is a view illustrating a method for setting up an alarm, according to another embodiment.

FIG. 12 is a view illustrating the method for setting up the alarm, according to another embodiment.

For example, FIG. 12 illustrates UI objects 1201 to 1211 output onto the display 640 of the electronic device 601 illustrated in FIG. 6.

According to an embodiment, a user may input a user input, which is to set up the alarm, into the electronic device. The electronic device may extract a task (alarm purpose), a time parameter, or other information, from the user input by using a specified application (e.g., an alarm application). Thereafter, the electronic device may register the alarm at the time represented by the time parameter and may register the task and other information.

For example, when the user utters "Alarm! I am going to travel to Jeju island by airplane on August 1.". As NL, the electronic device 601 may extract "August 1" as the time parameter, "travel" as a task, and "airplane" as the transportation from the NL. The electronic device 601 may set up an alarm based on the extracted information and may display a UI object 1201 on an execution screen of the specified application as illustrated in FIG. 12. According to an embodiment, the electronic device may retrieve an alarm template appropriate to the "travel" (task) from the memory or the server in background. From the foregoing statement, the electronic device 610 detects the verb "travel," a location "Jeju island" as a location, "airplane" as a transportation mode. Accordingly, a "Travel" template is selected. In some embodiments, there may be different templates for "Travel" based on the distance to the destination. For example, there may be a "local" for travel within the city, "domestic" for travel to another city, and "Overseas" for longer travel (based on a comparison between the location and current destination).

In one embodiment, each of the different templates may include different additional items. For example, in the domestic travel template, the template may include a checklist for light travel, such as towels, and swimsuit. An international travel template may additional items such as a reminder to take the passport, and arrangements for foreign currency.

According to an embodiment, the electronic device may display at least one of a plurality of items included in the retrieved alarm template on the display 640. For example, referring to the UI objet 1203, the electronic device may display, on the display, preparation material items 1213 included in the template. The preparation material items 1213 may be, for example, added, removed, or modified (e.g., the change in quantity). For example, among the preparation material items 1213, "travel guide book" may be removed by the user and "driver's license" may be newly added. The user may determine the preparation state of each preparation material by selecting a check box of the preparation material items 1213.

According to an embodiment, the electronic device 601 may display, on the display, an item 1224 for the inquiry as to receiving a notification until all preparation materials of preparation material items 1214 included in the UI object 1205 are prepared. For example, the electronic device 601 may provide an alarm once per day until a travel departure date (August 1) under a condition subsequent that all preparation material items 1214 are checked if the item 1224 is checked.

Referring to the UI object 1207, the electronic device may provide alarms at 10:00 p.m. on July 29, 10:00 p.m. on July 30, 10:00 p.m. on July 31, and 8:30 a.m. on August 1 until all preparation materials of preparation material items 1217 are prepared. Accordingly, even if three items are checked among the preparation material items 1217, which are included in the UI object 1207, the setting-up of the alarms may not be released. According to various embodiments, four alarms may be determined based on a template creation history of the user.

Referring to the UI object 1209, the electronic device may release the setting-up of preset alarms since all preparation material items 1219 are checked. In addition, the electronic device 601 may additionally display an item 1229 for an inquiry as to whether to set up an alarm to notify a travel departure date. For example, the user may set up the alarm, which is to notify the travel departure date, to 10:30 a.m. on the travel departure date.

Referring to the UI object 1211, the electronic device may output, on the display, an alarm setting result to 10:30 a.m. on the travel departure date together with checked items 1231 representing that all preparation materials are prepared. In other words, the electronic device may output, onto the display, the setting result of items included in the completed template.

FIGS. 13A to 13F are views illustrating that a method for setting up an alarm is implemented to be performed together with an interactive application, according to another embodiment.

Referring to FIG. 13A, the electronic device may execute the interactive application. As the interactive application is executed, the electronic device may display a screen 1301 on the display. The user may provide a user input, which is to set up an alarm, into the electronic device. For example, the user may input an NL of "Alarm! I'm going to travel to Jeju island by airplane on August 1." into an input field 1311 included in the screen 1301. For example, the NL may be input into the input field 1311 in a text or voice format.

Figure 13B:
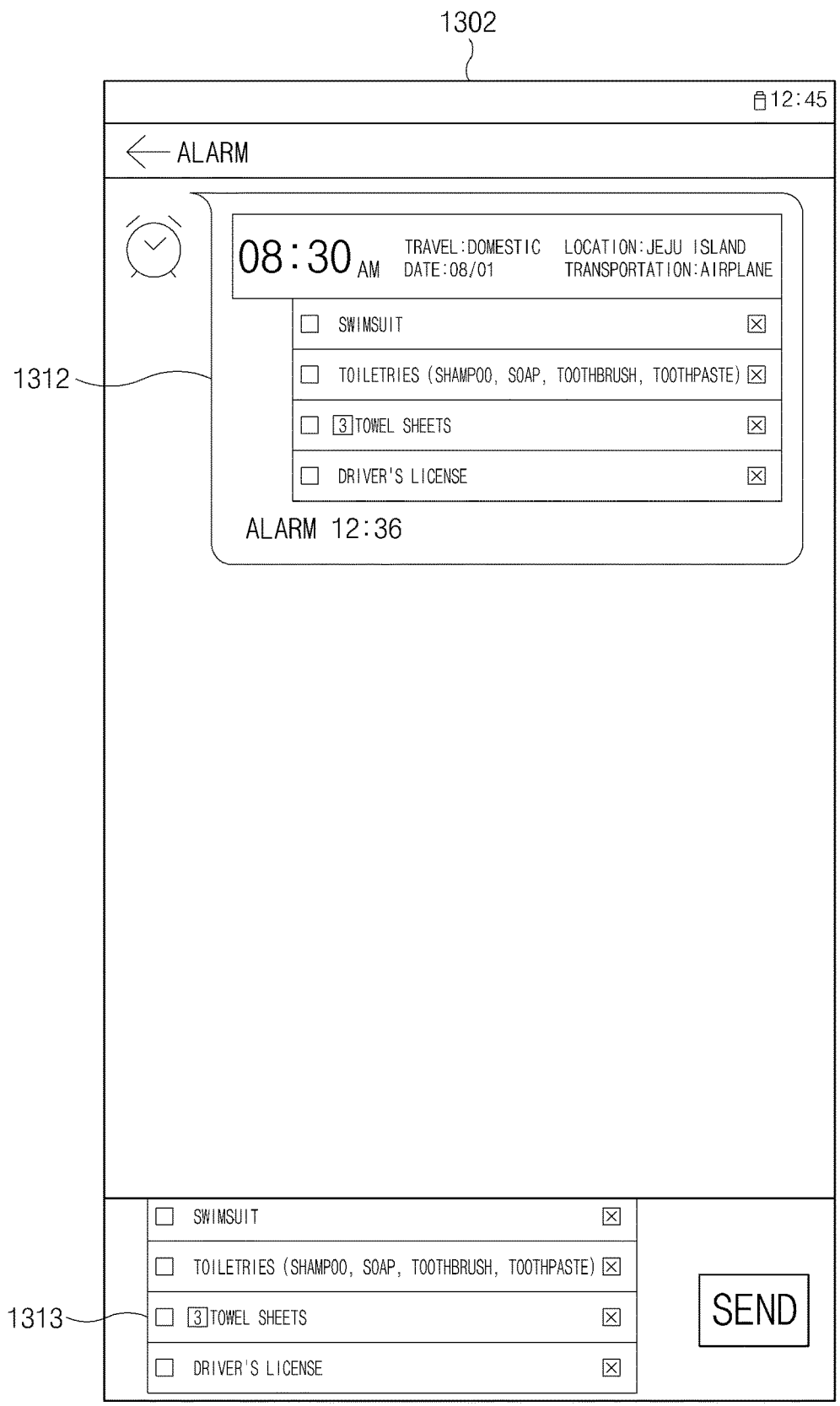

Referring to FIG. 13B, as the user input of "Alarm! I'm going to travel to Jeju island by airplane on August 1." is confirmed, the electronic device 601 may display a screen 1302 on the display. The electronic device may set up an alarm for the traveling on August 1 by extracting an alarm purpose (e.g., traveling) and a time parameter (e.g., August 1) from the NL.

According to an embodiment, the electronic device may retrieve a template associated with the alarm purpose (e.g., traveling) from the memory or the server as the user input is confirmed. Items for travel preparation materials included in the template may be included, together with the set-up alarm, in the screen 1302 as illustrated in a UI object 1312. In addition, the electronic device may provide, into an input field 1313, items guiding a user such that the user inputs the confirmation state of the travel preparation materials. The user may delete a preparation material item, which is displayed through the input field 1313, may add a new preparation material item, or may modify a specific preparation material item (e.g., change in the number of towels). For example, when a swimsuit, toiletries, and three towels are prepared, the user may select items for the swimsuit, toiletries, and three towels through the input field 1313.

Figure 13C:
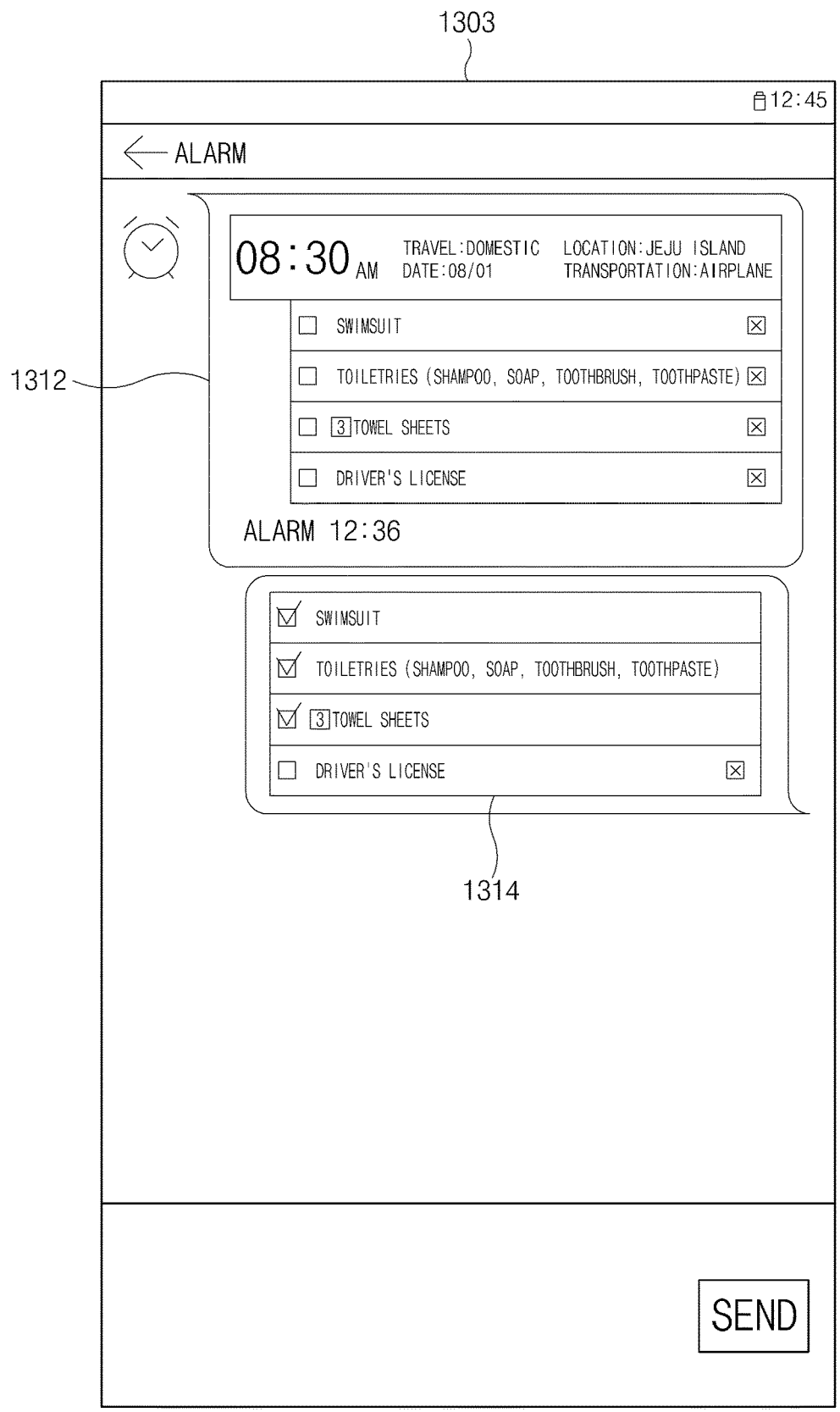

Referring to FIG. 13C, since the user selects the items for the swimsuit, toiletries, and three towels, the electronic device may display, on the display, the details selected by the user as illustrated in a UI object 1314 included in a screen 1303.

Figure 13D:
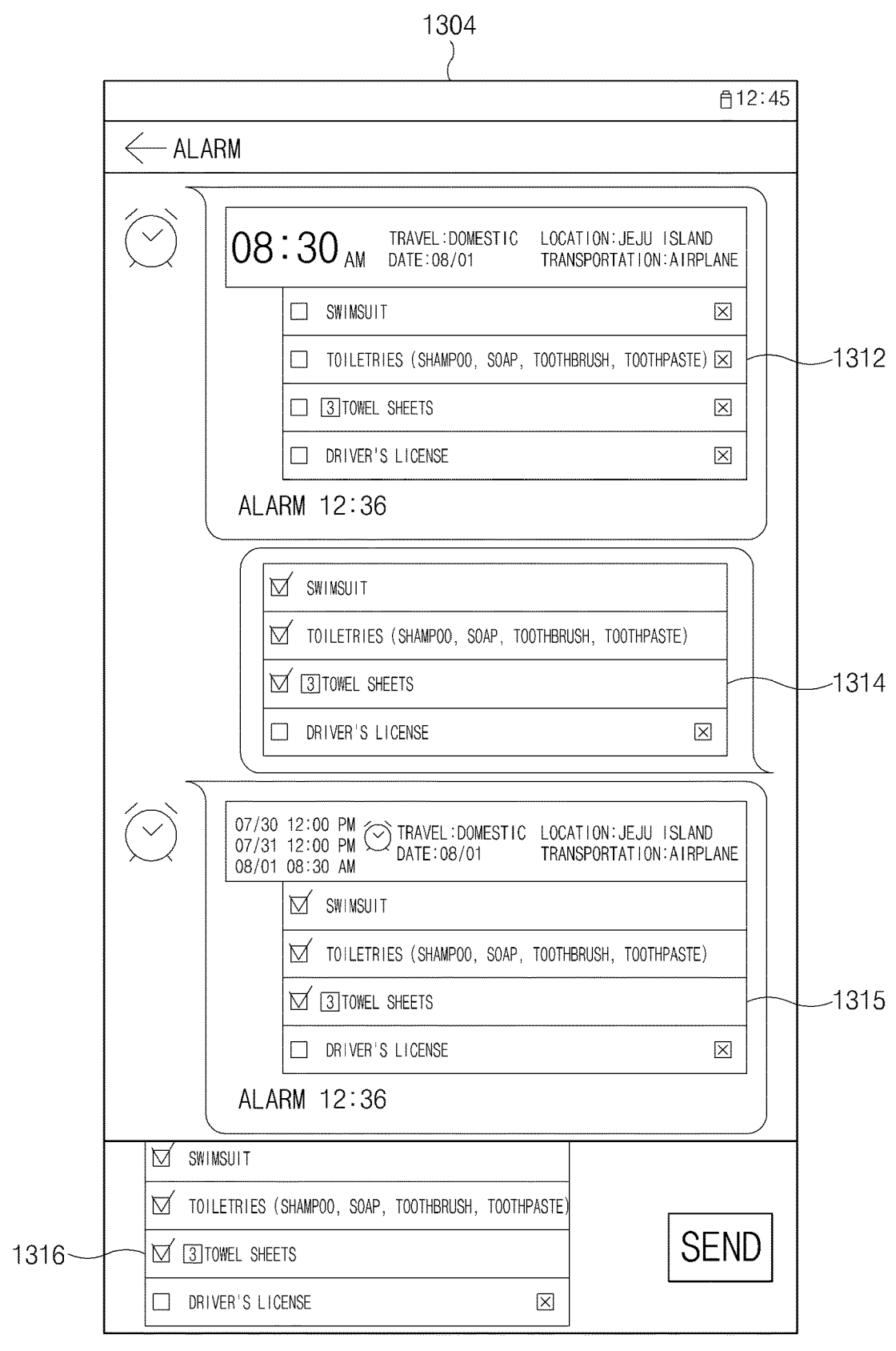

Referring to FIG. 13D, the electronic device may display a screen 1304 on the display. The electronic device may mark the items for the swimsuit, toiletries, and three towels, which are selected by the user, and may provide a plurality of alarms until all travel preparation materials are prepared. For example, as illustrated in a UI object 1315 included in the screen 1304, alarms may be provided at 12:00 p.m. on July 30, 12:00 p.m. on July 31, and 8:30 a.m. on August 1 until all items for the travel preparation materials (e.g., a swimsuit, toiletries, three towels, and a driver's license) are checked (selected). The alarms may be, for example, automatically set, based on the template creation history of the user.

According to an embodiment, since all preparation material items (e.g., a swimsuit, toiletries, three towels, and a driver's license) are not confirmed, the electronic device may continuously induce the user to select all preparation material items as illustrated in an input field 1316.

Figure 13E:
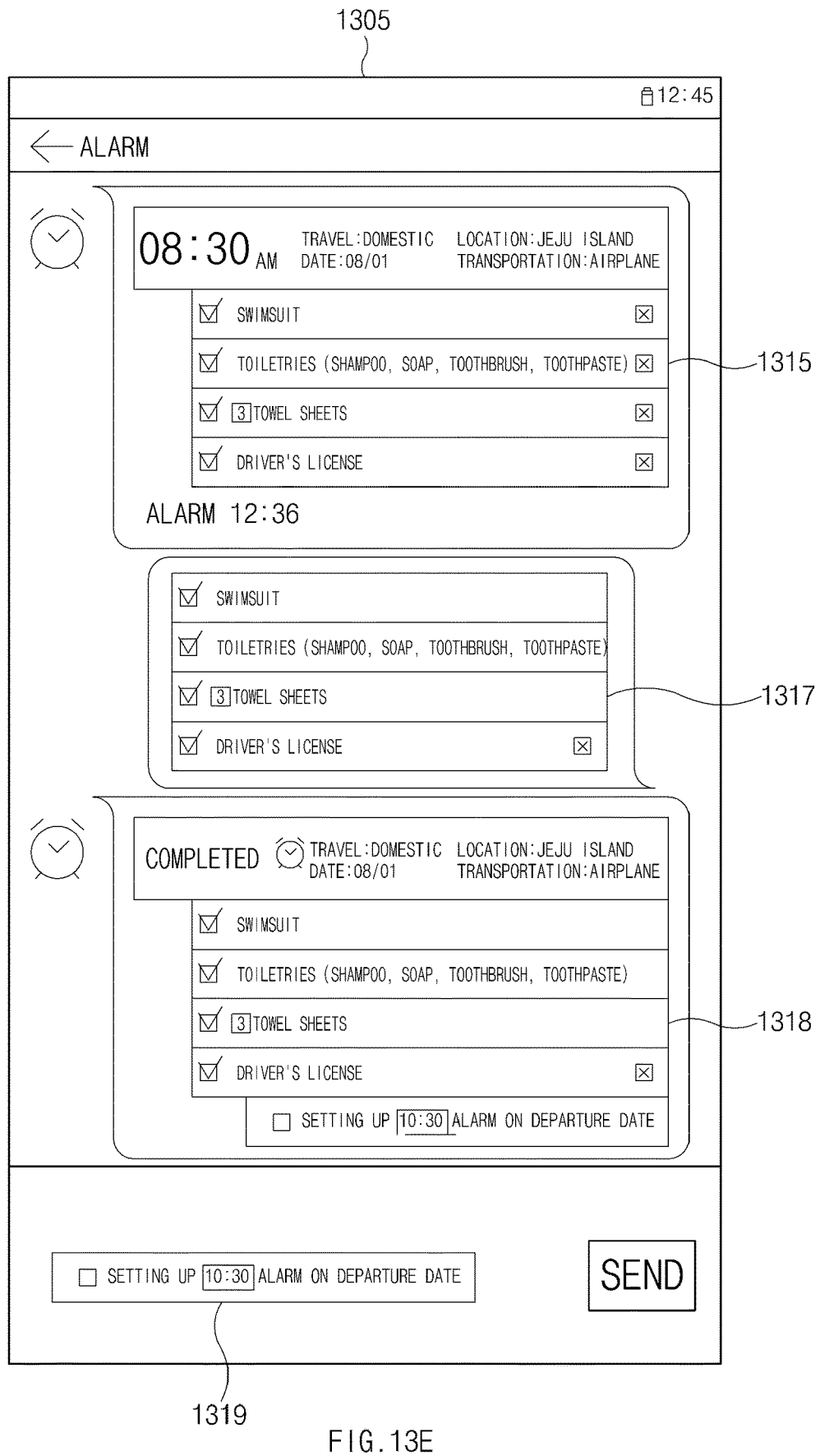

Referring to FIG. 13E, the electronic device may output the selection details of the user on the display, as illustrated in a UI object 1317 included in a screen 1305 when the selection for all preparation material items (e.g., a swimsuit, toiletries, three towels, and a driver's license) is determined.

According to an embodiment, since all preparation material items are confirmed, the electronic device may display, on the display, the preparation material items as illustrated in a UI object 1318 included in the screen 1305. In this case, the electronic device may release all alarms which are set up to 12:00 p.m. on July 30, 12:00 p.m. on July 31, and 8:30 a.m. on August 1.

According to an embodiment, the electronic device may additionally display, on the UI object 1318 and an input field 1319, an item for an inquiry as to whether to set up an alarm to notify a travel departure date. The alarm to notify the travel departure date may be set up to 10:30 a.m. by using the input field 1319.

Figure 13F:
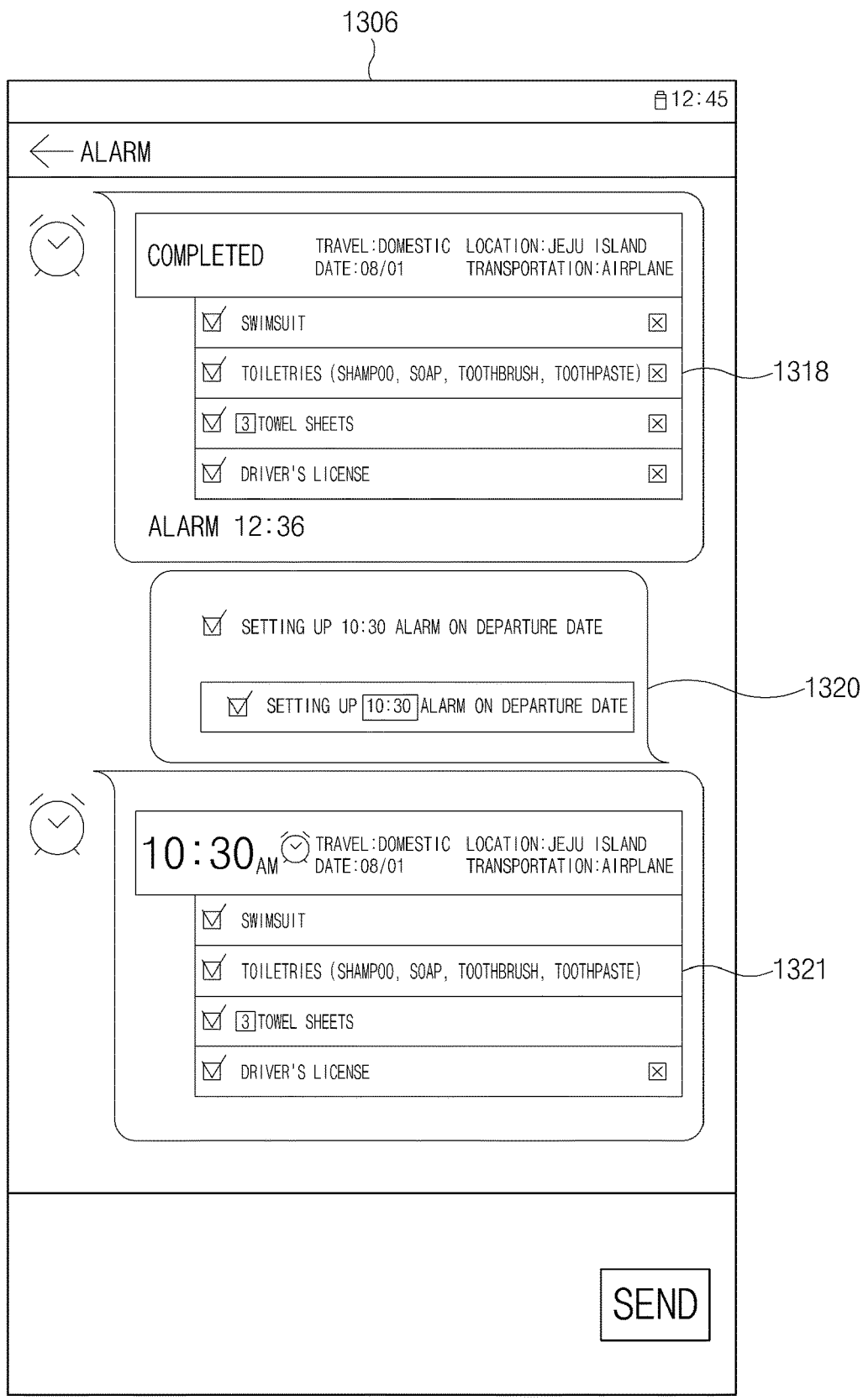

Referring to FIG. 13F, since the alarm to notify the travel departure date is set up to 10:30 a.m. the electronic device may display the setting-up details of the alarm on the display as illustrated in a UI object 1320 included on a screen 1306. In addition, the electronic device may display, on the display, items subject to the setting up of the alarm are displayed on the display as illustrated in a UI object 1321.

FIG. 14 illustrates an example of an alarm template, according to various embodiments.

FIG. 14 illustrates a domestic travel alarm template 1401, an overseas travel alarm template 1402, a cooking ingredients alarm template 1403, a cooking recipe alarm template 1404, a diet alarm template 1405 created by a user, and a diet alarm template 1406 created by another user. The alarm templates 1401 to 1406 may include items necessary for accomplishing the alarm purpose (task).

According to an embodiment, the domestic travel alarm template 1401 may include items for preparation materials necessary for a domestic travel. In addition, the overseas travel alarm template 1402 may include items for preparation materials necessary for an overseas travel. The electronic device may provide, for a user, alarms based on the templates 1401 to 1402 such that the user prepares for all preparation materials before traveling.

According to an embodiment, the cooking ingredients alarm template 1403 may include items for ingredients of a specified cooking (e.g., spaghetti allio olio). The electronic device may provide, for a user, alarms based on the cooking ingredients alarm template 1403 such that the user prepares for all materials before starting cooking.

According to an embodiment, the cooking recipe alarm template 1404 may include items for steps for completing the specified cooking (e.g., spaghetti allio olio). The electronic device may provide the alarm based on the cooking recipe alarm template 1404 such that the user completes the specified cooking according to certain steps.

According to an embodiment, the diet alarm template 1405 may include items for actions to be taken for weight loss. The items included in the diet alarm template 1405 may be personally created by the user. According to another embodiment, a diet alarm template may be created by another user like the diet alarm template 1406. For example, the electronic device may retrieve the diet alarm template 1406 created by a celebrity from a server and may provide an alarm for a user of the electronic device, based on the diet alarm template 1406 created by the celebrity.

Although FIG. 14 illustrates the alarm templates 1401 to 1406, the present disclosure is not limited thereto and more various templates may exist. In addition, each of items included in the alarm template may be manually created by a user or may be added, deleted, or modified based on an alarm template creation history of the user.

According to embodiments disclosed in the present disclosure, the electronic device may retrieve the most appropriate template to the alarm purpose and may provide the optimal alarm for the user, based on the retrieved template.

According to an embodiment, an electronic device comprises a housing; one or more input/output (I/O) interfaces included in or on the housing; a processor electrically connected to the one or more I/O interfaces; and a memory electrically connected to the processor, wherein the memory stores a plurality of templates associated with a plurality of tasks, wherein each of the templates includes a plurality of parameters for at least partially completing a respective one of the tasks, and wherein the memory further stores instructions that, when executed, cause the processor to: receive, via the one or more input/output interfaces, a user input to set up an alarm associated with a task to be performed at a selected time, wherein the input includes a first time parameter associated with the selected time; select one of the plurality of templates, based at least partly on the user input; determine a second time parameter of the plurality of parameters of the selected template, based at least partly on data stored in the memory or received from outside the electronic device; determine a time for the alarm, based at least partly on the first time parameter and the second time parameter; and provide the alarm at the determined time via the one or more input/output interfaces.

According to an embodiment, the instructions further cause the processor to prompt the user to provide the second parameter via with the one or more input/output interfaces; receive another user input via the one or more input/output interfaces in response to the prompt; and determine the second time parameter, based at least partly on the user input.

According to an embodiment, the instruction may further cause the processor to determine at least one of a pattern, frequency, or sound level of the alarm, and to provide the alarm using the at least one of the pattern, the frequency, or the sound level via the user interface.

According to an embodiment, an electronic device comprises an input device; a display; a processor; and a memory electrically connected to the input device, the display, and the processor, wherein the memory stores instructions that, when executed, cause the processor to: receive a first user input including a task and a time parameter via the input device; retrieve a template associated with the task, wherein the template comprises a plurality of fields; display the template, on the display with at least one of the plurality of fields populated with at least one item, and provide a specified alarm for a user at a time based on the time parameter, when the template is completed by a second user input received via the input device.

According to an embodiment, the specified alarm may include displaying, on the display, a UI screen in which the template with each of the plurality of fields is populated.

According to an embodiment, the template may include at least one item used to process the task.

According to an embodiment, the memory further store data on a template creation history of a user, and an instruction that, when executed, causes the processor to fill out some of the plurality of fields in the template, based on the data.

According to an embodiment, the time based on the time parameter may be adjusted based on the template.

According to an embodiment, the memory may store at least one template, and may further store an instruction that, when executed, causes the processor to extract the task by analyzing the user input and the time parameter, and retrieve the template associated with the task from the memory.

According to an embodiment, the electronic device may further include a communication circuit that communicates with a server providing a plurality of templates. The memory may further store an instruction that, when executed, causes the processor to transmit the user input to the server via the communication circuit; and to retrieve the template associated with the task from the server, in response to transmitting the user input.

According to an embodiment, the server may extract the task by analyzing the user input, and provide the template associated with the task to the electronic device.

According to an embodiment, the server may add or modify the at least one item included in the template by using information retrieved via a network.

According to an embodiment, the user input may include an NL input.

According to an embodiment, the electronic device may further include an audio output module generating a sound.

The specified alarm may include generating a specified sound by the audio output module.

According to an embodiment, at least one of a time at which the specified sound is generated, a volume of the specified sound, a pattern in which the specified sound is generated, or the number of times in which the specified sound is generated, may depend on the template.

According to an embodiment, the electronic device may further include a actuator generating vibration. The specified alarm may include generating the vibration by the actuator.

According to an embodiment, at least one of a time at which the vibration is generated, an intensity of the vibration, a pattern in which the vibration is generated, or the number of times in which the vibration is generated, may depend on the template.

According to an embodiment, a method for setting up an alarm of an electronic device may include receiving a user input including a task and a time parameter, retrieving a template associated with the task, wherein the template comprises a plurality of fields, displaying, on the display, the template with at least one of the plurality of fields populated with at least one item, and providing a specified alarm for a user at a time based on the time parameter, when each of the plurality of fields of the template are populated by an additional user input.

According to an embodiment, the method for setting up the alarm may further include filling out some of the plurality of fields included in the template, based on prior usage by the user, According to an embodiment, the method for setting up the alarm may include adding or modifying the at least one item included in the template, based on information retrieved via a network.

The term "module" used in this disclosure may represent, for example, a unit including one or more combinations of hardware, or hardware programmed with instructions. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an input device;
   a communication circuitry configured to communicate over a network;
   a display;
   a processor; and
   a memory electrically connected to the input device, the display, and the processor,
   wherein the memory stores instructions that, when executed, cause the processor to:
   receive a first user input including a task and a first time parameter to set a first time of a first alarm via the input device;
   retrieve a template associated with the task, wherein the template comprises a plurality of fields;
   display the template on the display with at least one of the plurality of fields populated with at least one item for completing at least one subtask related the task;
   retrieving, from the network, based on the at least one item populating the template, a plurality of selectable options for completing the subtask after the first time;
   receiving a second user input selecting one of the plurality of selectable options;
   display a UI object confirming the option selected by the second user input; and
   determine a second time parameter to set a second time of a second alarm based on data related to the selected option, the data stored in the memory or received via the network through the communication circuitry, wherein:
   when the second time parameter is determined, provide the first alarm to activate at a time corresponding to the first time parameter, and the second alarm to activate at a time corresponding to the second time parameter, and
   when the second time parameter is not determined, determine the second time parameter based on a third user input received via the input device.

2. The electronic device of claim 1, wherein when the at least one item refers to transportation parameters including a transportation type, the selectable options include a plurality of transportation events corresponding to the transportation type scheduled for departure after the first time.

3. The electronic device of claim 2, wherein the template includes the at least one item used to process the task, and
   wherein the second user input selecting one of the plurality of selectable options includes selection of a transportation event, and
   wherein after the selected transportation event is processed by a ticketing application, a user interface (UI) object is displayed to confirm that the selected transportation event is purchased and ticketed.

4. The electronic device of claim 1, wherein the memory further includes data including a template creation history of a user, and wherein the memory further stores instructions that, when executed, causes the processor to:
   completing at least some of the plurality of fields in the template based on the data.

5. The electronic device of claim 1, wherein the time based on the first time parameter is adjustable based on the template.

6. The electronic device of claim 1, wherein the memory further stores at least one template, and wherein the memory further stores instructions that, when executed, causes the processor to:
   extract the task by analyzing the first user input; and
   retrieve the template associated with the task from the memory.

7. The electronic device of claim 1,
   wherein the communication circuit is configured to communicate with a server providing the plurality of templates, wherein the memory further stores instructions that, when executed, cause the processor to:
   transmit the first user input to the server via the communication circuit; and
   receive the template associated with the task from the server.

8. The electronic device of claim 7, wherein the server is configured to:
   extract the task by analyzing the first user input; and
   provide the template associated with the task to the electronic device.

9. The electronic device of claim 7, wherein the server is configured to: add an item into the template or modify the at least one item included in the template using information retrieved via a network.

10. The electronic device of claim 1, wherein the instructions are further executable by the processor to cause the electronic device to:
    execute an artificial intelligent agent in which inputs and outputs between a user and the electronic device are displayed as conversational objects,
    wherein the first user input is displayed within a first conversational object including the first time parameter, and the plurality of selectable options are added to the first conversational object, and
    wherein after selection by the second user input, the selected one of the plurality of selectable options is displayed as a second conversational object disposed separate from and under the first conversational object.

11. The electronic device of claim 1, further comprising:
    an audio output module configured to generate sound,
    wherein providing the first alarm includes generating a specified sound using the audio output module.

12. The electronic device of claim 11, wherein during generation of the specified sound, at least one of a time period to provide the specified sound, a volume of the specified sound, a pattern in which the specified sound is generated, or a number of times in which the specified sound is repeated is generated based on the template.

13. The electronic device of claim 1, further comprising:
    a haptic actuator configured to generate vibrations,
    wherein the first alarm includes generating vibration by the haptic actuator.

14. The electronic device of claim 13, wherein at least one of a time at which the vibration is generated, an intensity of the vibration, a pattern in which the vibration is generated, or a number of times in which the vibration is generated is generated based on the template.

15. A method configuring an alarm in an electronic device, the method comprising:
- receiving, at the electronic device, a first user input including a task and a first time;
- retrieving, at the electronic device, a template associated with the task, wherein the template comprises a plurality of fields;
- displaying, on a display of the electronic device, the template with at least one of the plurality of fields populated with at least one item for completing at least one subtask related the task;
- retrieving, through a communication circuit coupled to a network, based on the at least one item populating the template, a plurality of selectable options for completing the subtask after the first time;
- receiving a second user input selecting one of the plurality of selectable options;
- displaying a UI object confirming the option selected by the second user input; and
- determining a second time based on data related to the selected option, the data stored in a memory or received via a network through a communication circuitry, wherein:
    - when the second time is determined, providing, at the electronic device, a specified alarm for a user at a time based on at least the first time and the second time, and
    - when the second time is not determined, determining the second time based on a third user input received via an input device of the electronic device.

16. The method of claim 15, further comprising:
completing at least some of the plurality of fields included in the template based on prior usage by the user,
wherein when the first user input further includes a transportation mode parameter, the retrieved template is selected from among a plurality of templates by association with the transportation mode parameter in addition to the task.

17. The method of claim 15, wherein an item is added into the template or the at least one item included in the template is modified based on information retrieved via a network.

* * * * *